United States Patent
Gambetta et al.

(10) Patent No.: US 10,452,990 B2
(45) Date of Patent: Oct. 22, 2019

(54) COST FUNCTION DEFORMATION IN QUANTUM APPROXIMATE OPTIMIZATION

(71) Applicant: International Business Machines Corporation, Armonk, NY (US)

(72) Inventors: Jay M. Gambetta, Yorktown Heights, NY (US); Antonio Mezzacapo, Westchester, NY (US); Ramis Movassagh, Boston, MA (US); Paul K. Temme, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 9 days.

(21) Appl. No.: 15/823,654

(22) Filed: Nov. 28, 2017

(65) Prior Publication Data

US 2019/0164079 A1    May 30, 2019

(51) Int. Cl.
*G06N 10/00* (2019.01)
*G06F 7/544* (2006.01)
*G06N 5/00* (2006.01)

(52) U.S. Cl.
CPC .......... *G06N 10/00* (2019.01); *G06F 7/544* (2013.01); *G06N 5/003* (2013.01)

(58) Field of Classification Search
None
See application file for complete search history.

(56) References Cited

U.S. PATENT DOCUMENTS

| | | | | |
|---|---|---|---|---|
| 2004/0167753 | A1* | 8/2004 | Downs | G06N 10/00 703/2 |
| 2016/0162798 | A1* | 6/2016 | Marandi | G02F 3/00 708/191 |
| 2018/0096085 | A1* | 4/2018 | Rubin | G06F 17/5009 |
| 2018/0260731 | A1* | 9/2018 | Zeng | G06F 15/82 |

OTHER PUBLICATIONS

Farhi, et al., "A Quantum Approximate Optimization Algorithm Applied to a Bounded Occurrence Constraint Problem," arXiv:1412.6062v2 [quant-ph] Jun. 25, 2015, 13 pages.
Farhi, et al., "A Quantum Approximate Optimization Algorithm," arXiv:1411.4028v1 [quant-ph] Nov. 14, 2014, 16 pages.

(Continued)

*Primary Examiner* — Michael D. Yaary
(74) *Attorney, Agent, or Firm* — Amin, Turocy & Watson, LLP

(57) ABSTRACT

Techniques for performing cost function deformation in quantum approximate optimization are provided. The techniques include mapping a cost function associated with a combinatorial optimization problem to an optimization problem over allowed quantum states. A quantum Hamiltonian is constructed for the cost function, and a set of trial states are generated by a physical time evolution of the quantum hardware interspersed with control pulses. Aspects include measuring a quantum cost function for the trial states, determining a trial state resulting in optimal values, and deforming a Hamiltonian to find an optimal state and using the optimal state as a next starting state for a next optimization on a deformed Hamiltonian until an optimizer is determined with respect to a desired Hamiltonian.

25 Claims, 15 Drawing Sheets

(56) References Cited

OTHER PUBLICATIONS

Nelder et al., "A simplex method for function minimization," The computer journal, 7(4), 1965, 6 pages.

Barak, et al., "Beating the random assignment on constraint satisfaction problems of bounded degree," arXiv:1505.03424v2 [cs.CC] Aug. 11, 2015, 15 pages.

Shin, et al., "How "Quantum" is the D-Wave Machine?," arXiv:1401.087v2 [quant-ph] May 2, 2014, 8 pages.

Paraoanu, "Microwave-induced coupling of superconducting qubits," arXiv:0801.4541v2 [cond-mat.mes-hall] Jan. 30, 2008, 6 pages.

Spall, "Multivariate Stochastic Approximation Using a Simultaneous Perturbation Gradient Approximation," IEEE Transactions on Automatic Control, vol. 37, No. 3, Mar. 1992, 10 pages.

Montanaro, "Quantum algorithms: an overview," arXiv:1511.04206v2 [quant-ph] Dec. 17, 2015, 17 pages.

Farhi, et al., "Quantum Computation by Adiabatic Evolution," arXiv:quant-ph/0001106v1 Jan. 28, 2000, 24 pages.

Brandão, et al., "Quantum Speed-ups for Semidefinite Programming," arXiv:1609.05537v5 [quant-ph] Sep. 24, 2017, 24 pages.

Albash, et al., "Reexamining classical and quantum models for the D-Wave One processor," arXiv:1409.3827v1 [quant-ph] Sep. 12, 2014, 18 pages.

Chow, et al., "A simple all-microwave entangling gate for xed-frequency superconducting qubits," arXiv:1106.0553v1 [quant-ph] Jun. 3, 2011, 5 pages.

International Search Report and Written Opinion for International Application Serial No. PCT/EP2018/082495 dated Mar. 20, 2019, 16 pages.

Kandala, et al., "Hardware-efficient Variational Quantum Eigensolver for Small Molecules and Quantum Magnets," arXiv:1704.05018v2, Oct. 13, 2017 (Oct. 13, 2017), XP055568705, Retrieved from the Internet: URL: https://arxiv.org/abs/1704.05018v2 [retrieved on Oct. 16, 2017] Supplementary Information, in particular sections I and IV.

Yang, et al., Optimizing variational quantum algorithms using Pontryagin's minimum principle, arXiv:1607.06473v3, Mar. 11, 2017 (Mar. 11, 2017), XP055568715, Retrieved from the Internet: URL:https://arxiv.org/abs/1607.06473v3 [retrieved on Mar. 14, 2017] sections I-III.

\* cited by examiner

COST FUNCTION DEFORMATION IN QUANTUM APPROXIMATE OPTIMIZATION

BACKGROUND

The subject disclosure relates to quantum computing, and more specifically, to solving combinatorial optimization problems with quantum circuits.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products facilitating automating quantum circuit debugging are described.

According to an embodiment, a system can comprise a mapping component that maps a cost functions to a Hamiltonian based on one or more constraints to map the optimization problem into an optimization problem over allowed quantum states, a trial state and measurement component that generates trial states corresponding to the Hamiltonian by physical time evolution of quantum hardware interspersed with control pulses to entangle qubits of the quantum hardware, and that measures a quantum cost function for the trial states to determine a trial state that results in optimal values, and a deformation component that deforms a Hamiltonian into a deformed Hamiltonian to find an optimal state, and uses the optimal state as a next starting state for a next optimization on the deformed Hamiltonian until an optimizer is determined with respect to a desired Hamiltonian.

According to another embodiment, a computer-implemented method is provided. The computer-implemented method can comprise mapping a cost function associated with the combinatorial optimization problem to an optimization problem over allowed quantum states, comprising constructing a quantum Hamiltonian for the cost function, and generating a set of trial states by a physical time evolution of the quantum hardware interspersed with control pulses. Furthermore, the computer-implemented method can comprise measuring a quantum cost function for the trial states, determining a trial state resulting in optimal values, and deforming a Hamiltonian to find an optimal state and using the optimal state as a next starting state for a next optimization on a deformed Hamiltonian until an optimizer is determined with respect to a desired Hamiltonian.

According to yet another embodiment, a computer program product facilitating solving a combinatorial optimization problem can be provided, the computer program product comprising a computer readable storage medium having program instructions embodied therewith, the program instructions executable by a processor to cause the processor to map a cost function associated with the combinatorial optimization problem to an optimization problem over allowed quantum states, comprising constructing a quantum Hamiltonian for the cost function, generate a set of trial states by a physical time evolution of the quantum hardware interspersed with control pulses, measure a quantum cost function for the trial states, determine a trial state resulting in optimal values, and deform a Hamiltonian to find an optimal state and using the optimal state as a next starting state for a next optimization on a deformed Hamiltonian until an optimizer is determined with respect to a desired Hamiltonian.

In yet another embodiment, a computer-implemented method can be provided, comprising obtaining a starting Hamiltonian having associated starting control parameters. Aspects may include using quantum hardware to deform the starting Hamiltonian into a deformed Hamiltonian associated with optimal control parameters for that deformed Hamiltonian, using the quantum hardware to repeatedly deform the deformed Hamiltonian with the associated optimal control parameters for that deformed Hamiltonian into further deformed Hamiltonians and further optimal control parameters associated therewith until a desired Hamiltonian is reached, and outputting information corresponding to the desired Hamiltonian and the optimal control parameters associated with the desired Hamiltonian.

In another embodiment, a computer program product can be provided. The computer program product can obtain a starting Hamiltonian having associated starting control parameters. The computer program product can use quantum hardware to deform the starting Hamiltonian into a deformed Hamiltonian associated with optimal control parameters for that deformed Hamiltonian, use the quantum hardware to repeatedly deform the deformed Hamiltonian with the associated optimal control parameters for that deformed Hamiltonian into further deformed Hamiltonians and further optimal control parameters associated therewith until a desired Hamiltonian is reached, and output information corresponding to the desired Hamiltonian and the optimal control parameters associated with the desired Hamiltonian.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
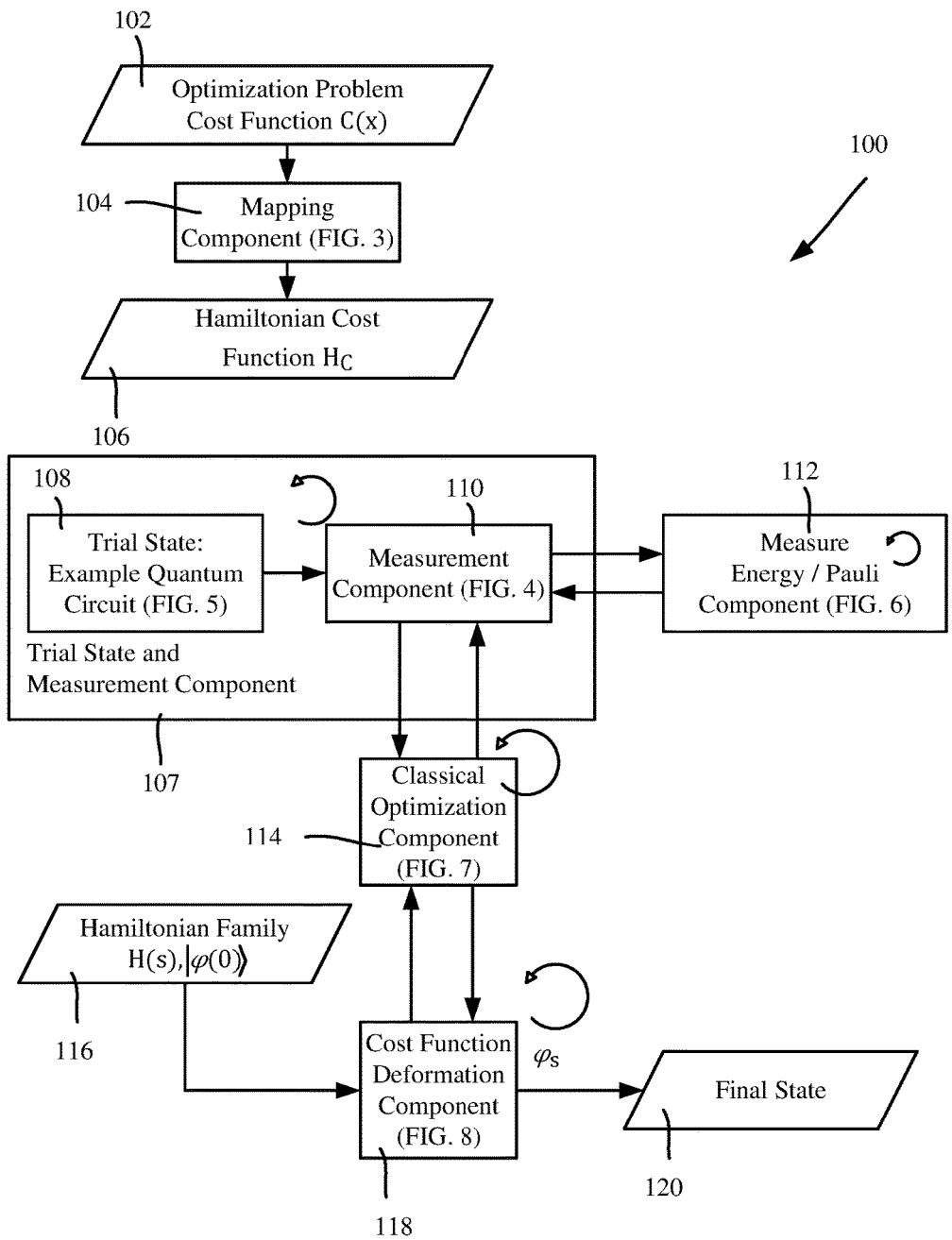
FIG. 1 is a block diagram of an example, non-limiting system that illustrates various aspects of the technology in accordance with one or more embodiments described herein.
Figure 3:
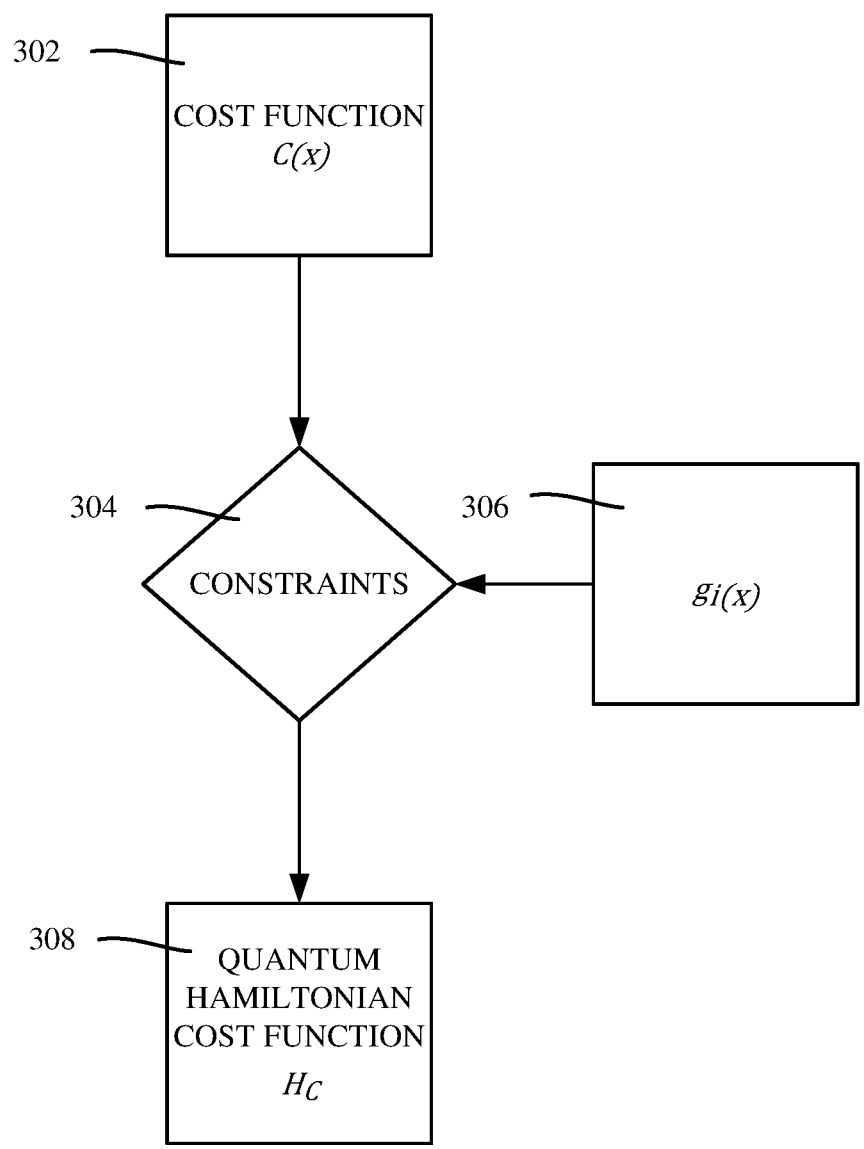
FIG. 3 illustrates an example diagram representing mapping of a cost function into a Hamiltonian cost function in accordance with one or more embodiments described herein.

FIG. 1 illustrates an example, general framework directed towards solving classical optimization problems, including by mapping an optimization problem cost function 102 via a mapping component 104 to a Hamiltonian cost function 106, as further described herein with reference to FIG. 3. Note that to represent the classical cost function as a quantum Hamiltonian, the Hamiltonian can be expressed as a linear combination of Pauli Z terms.

With a classical optimization problem/cost function mapped to a Hamiltonian cost function, trial state and measurement operations (as described with reference to FIGS. 4-6) can be performed to generate a short depth quantum circuit that depends on a set of continuous parameters. To this end, a trial state and measurement component 107 comprising the quantum computer/circuitry 108 can be used, for example, to sample from an optimal state in the computational basis to obtain bit strings that provide a good approximation to the binary optimization problem and to measure the quantum cost function for trial states in order to feed it to a classical optimization routine (as described in greater detail with reference to FIG. 7).

In general, quantum computing employs quantum physics to encode information, in contrast to binary digital techniques based on transistors. For example, a quantum computer can employ quantum bits (e.g., qubits), which are basic units of quantum information. Qubits operate according to a superposition principle of quantum physics and an entanglement principle of quantum physics. The superposition principle of quantum physics states that each qubit can represent both a value of "1" and a value of "0" at the same time. The entanglement principle of quantum physics states that qubits in a superposition can be correlated with each other. For instance, a state of a first value (e.g., a value of "1" or a value of "0") can depend on a state of a second value. As such, a quantum computer can employ qubits to encode information.

Aspects include modeling by microwave pulses sent to a superconducting quantum circuit that prepares a given quantum state(s) which are used to draw samples in optimization problems. As described with reference to FIGS. 4-6, a general approach is to take an initial guess of the set of continuous parameters that generates a particular state, write the Hamiltonian as a sum of energy measurements to obtain a state and average (e.g., sample from the state to measure average the Paulis), and report back the average value.

Figure 6:
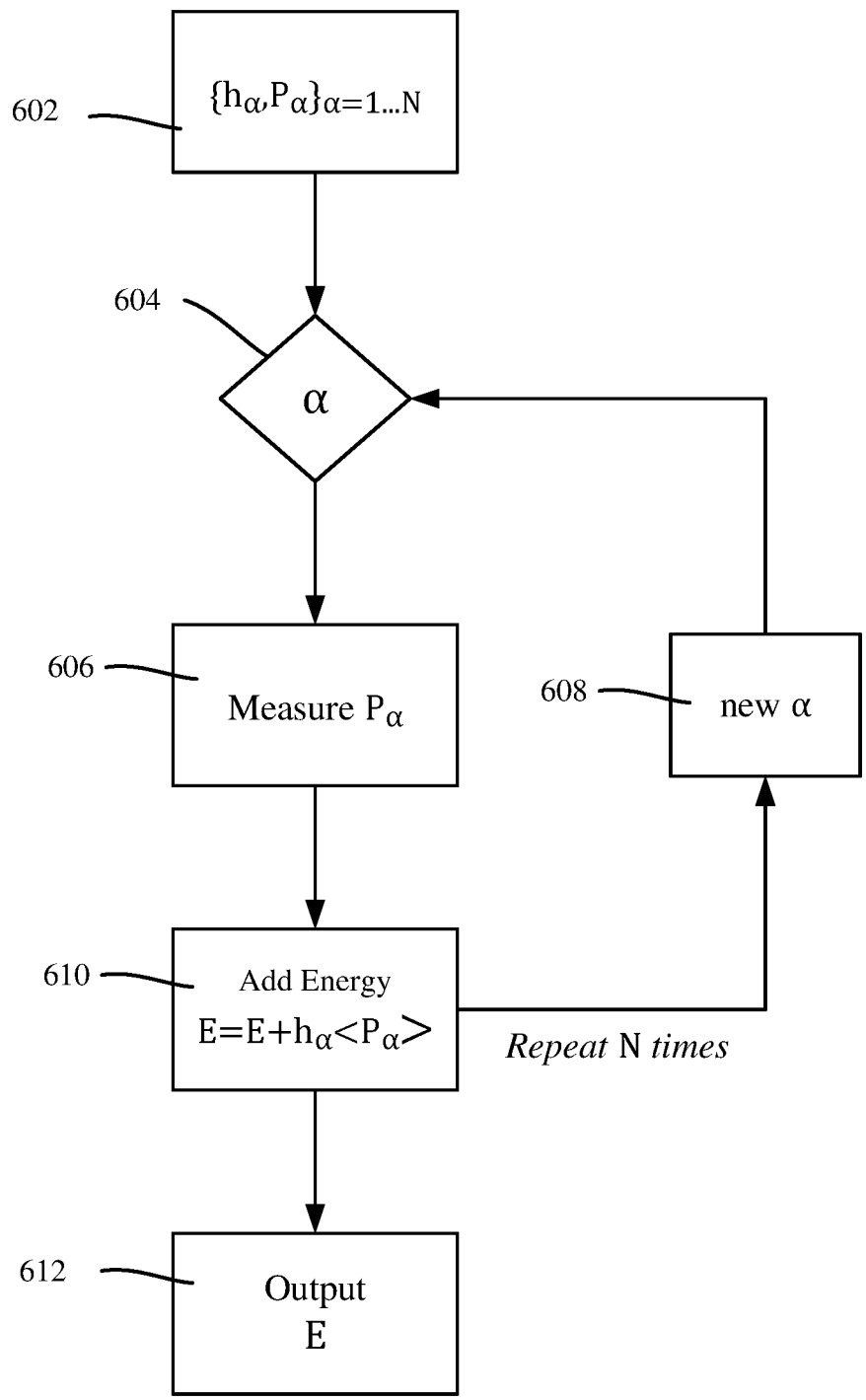
FIG. 6 illustrates an example diagram representing aspects related to outputting an energy value based on energy measurement in accordance with one or more embodiments described herein.
Figure 7:
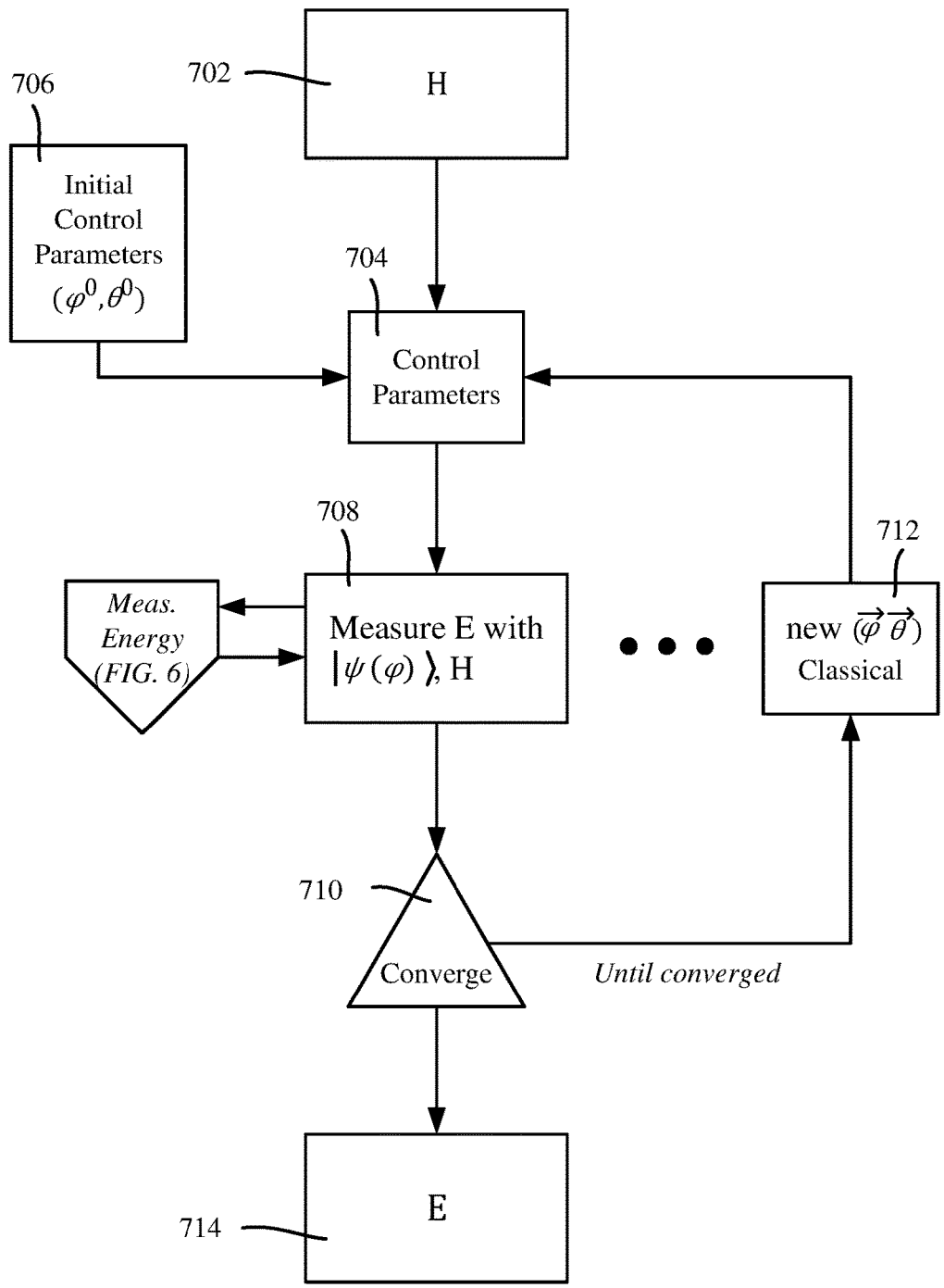
FIG. 7 illustrates an example diagram representing how classical optimization can be used as part of quantum approximate optimization in accordance with one or more embodiments described herein.

The classical optimization component (block 114 in FIG. 1) of FIG. 7 can provide a loop operation that starts with an initial guess of a set of control parameters, and provides the Hamiltonian along with the set of parameters. A measurement component 110 obtains the energy value at block 112 via a process described in more detail with reference to FIG. 6. This energy value can be mapped to a new proposed update set of the control parameters, and the loop repeats. Once the classical optimization converges (e.g., the energy value is not significantly changing), the energy value is output in association with its corresponding optimal control parameters. This optimization, for example, minimizes locally for one given Hamiltonian and finds the corresponding set of control parameters.

Block 118, described in greater detail with reference to FIG. 8 comprises a deformation component directed to the deformation of the cost function as described herein. In general, for a Hamiltonian family 116, the operations start with a cost function for which the exact control parameters are known, and loops (by applying a circuit of repeated drift steps) to steadily deform that cost function via the quantum circuits to solve a more specific optimization problem. In general and as will be understood, aspects of the technology start by deforming control parameters and tracking the cost function value until reaching the final state 120. More particularly, when a Hamiltonian representing an optimization problem is to be solved, a family of Hamiltonians (block 116) is chosen, starting with a simple Hamiltonian for which the answer is known, which provides for correctly choosing the control parameters knowing that the initial guess is very exact. From that starting Hamiltonian, over time the Hamiltonian is gradually deformed by permitted drift times to generate actual entanglement (FIG. 5) until the Hamiltonian for which the minimum is being sought is reached, and then used to solve a classical optimization problem.

Figure 2:
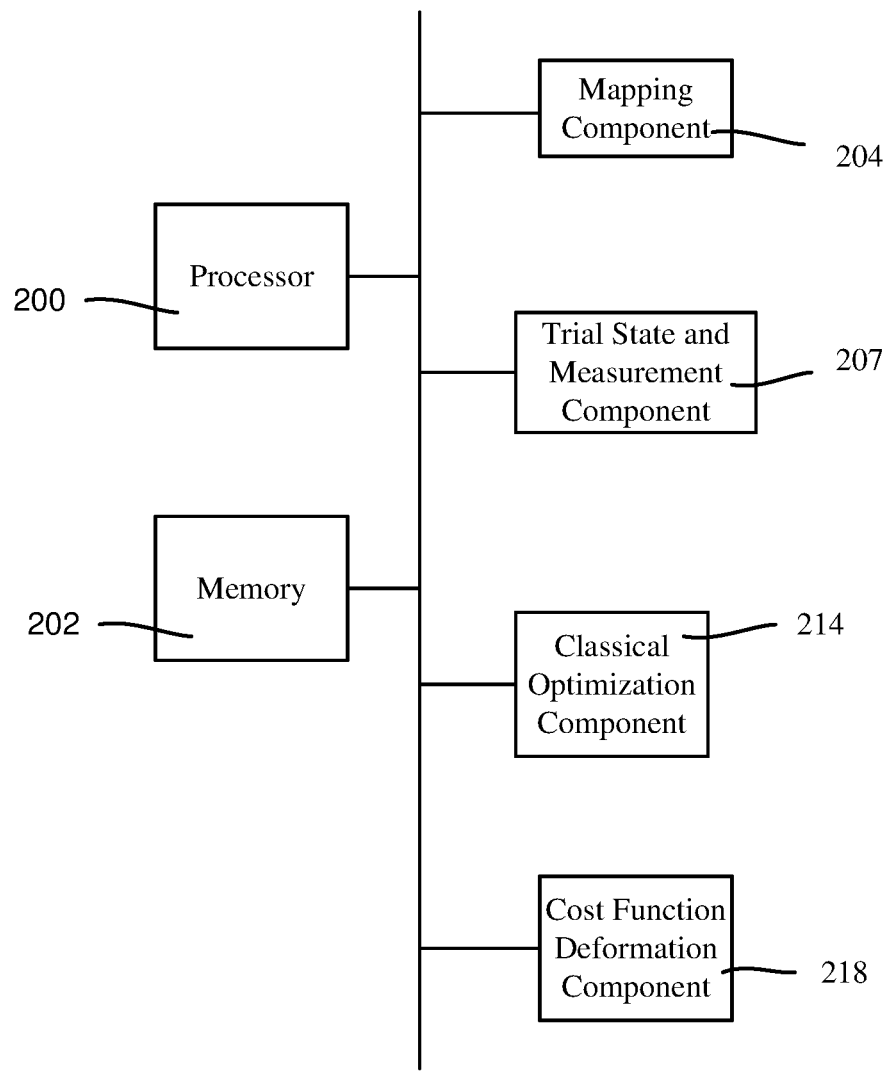
FIG. 2 illustrates a diagram representing example components corresponding to the various technical aspects of FIG. 1 in accordance with one or more embodiments described herein.

FIG. 2 shows an example of a processor 200 and memory 202 coupled to components corresponding to some of the blocks of FIG. 1. As can be seen, a mapping component 204, trial state and measurement component 207, classical optimization component 214 and cost function deformation component 218 can perform various operations as described herein. As is understood, however, these are only examples, and at least some of the exemplified components can be combined into a lesser number of components and/or the exemplified components can be further separated into additional components, additional components may be present in alternative embodiments, and so on.

Turning to various examples and related details, in general, optimization or combinatorial optimization refers to searching for an optimal solution in a finite or countably infinite set of potential solutions. Optimality is defined with respect to some criterion function that is to be minimized or maximized, which is typically called the cost function. There are various types of optimization problems. These include minimization: cost, distance, length of a traversal, weight, processing time, material, energy consumption, number of objects, etc.; and maximization: profit, value, output, return, yield, utility, efficiency, capacity, number of objects, etc.

Any maximization problem can be cast in terms of a minimization problem and vice versa. Hence the most general form of a combinatorial optimization problem is given by Minimize C(x)

subject to x∈S where x∈S, is a discrete variable and $C:D \to \mathbb{R}$ is the cost function that maps from some domain D in to the real numbers $\mathbb{R}$. Typically the variable x is subject to a set of constraints and lies within the set S of feasible points.

In binary combinatorial optimization problems, the cost function can typically be expressed as a sum of terms that only involve subsets $Q \subseteq [n]$ of the n bits in the string $\in \{0,1\}^n$. The cost function C is typically written in the canonical form $$C(x) = \sum_Q w_Q \prod_{i \in Q} x_i$$

for $x_i \in \{0,1\}$ and $w_Q \in \mathbb{R}$. Optimization is directed towards finding the n-bit string x for which C(x) is smallest.

FIG. 3 illustrates a block diagram of an example, non-limiting system that defines a way to represent a classical, combinatorial optimization problem on a quantum computer. In general, given a general cost function 302 (e.g., a binary combinatorial optimization problem seeking binary strings) that maps from some domain into real numbers, it is understood that many such cost functions typically have additional constraints 304. Those constraints can be constructed with helper functions, which in general modify (block 306) the general cost function with penalty terms for other helper functions. As described herein, the modified cost function gets mapped to a diagonal Hamiltonian cost function 308 (a diagonal matrix), which sets the entries of the diagonal based on the original problem, which can be represented with Pauli Z-terms as also described herein.

The cost function is thus mapped to a quantum problem by constructing for every C a Hamiltonian diagonal in the computational basis. The problem Hamiltonian $H_C$ associated to the cost function C(x) is defined as $H_C = \Sigma_x C(x)|x\rangle\langle x|,$ where $x \in \{0,1\}^n$ labels the computational basis states $|x\rangle \in C^d$ where $d=2^n$. The task of quantum optimization is then to find a state $|\psi\rangle \in \Omega \subset C^d$ from a variational subclass $\Omega$ of quantum states that minimizes the energy of $H_C$.

Minimize $\langle \psi | H_C | \psi \rangle$ subject to $|\psi\rangle \in \Omega$.

As is seen via FIG. 3, the binary optimization problem has been turned in to an optimization problem over allowed quantum states depending on a tractable set of parameters that specify $\Omega$. The state that minimizes the equation is denoted by $|\psi^*\rangle$. Additional details are described below with reference to equations Eq. 1-Eq. 4 (and the accompanying text) set forth herein.

Figure 4:
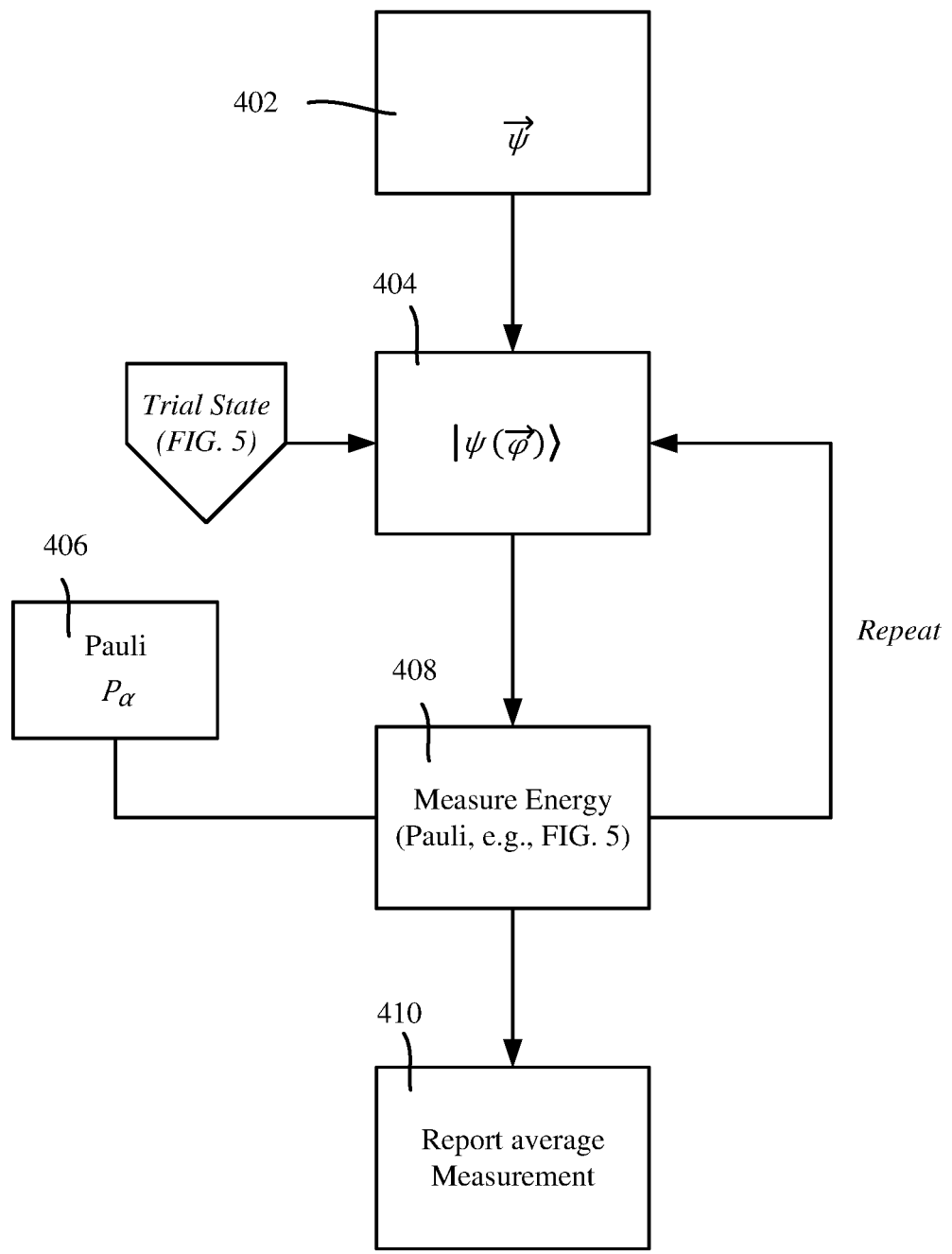
FIG. 4 illustrates an example diagram representing aspects related to energy measurement in accordance with one or more embodiments described herein.
Figure 5:
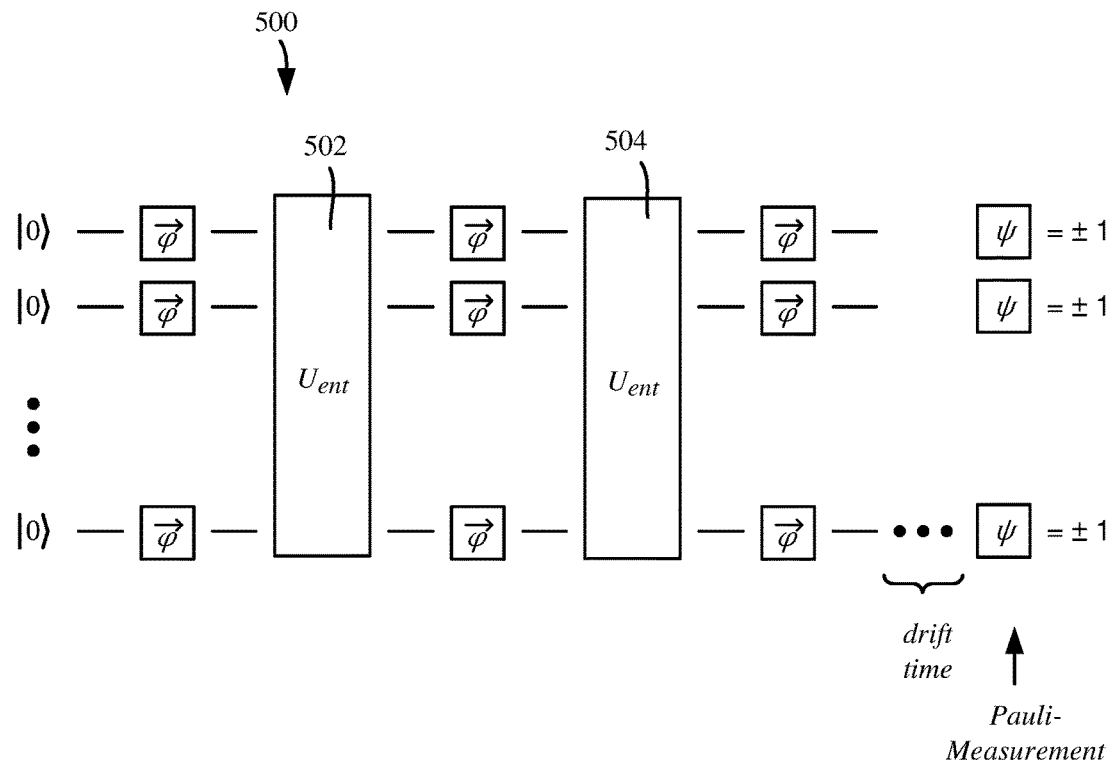
FIG. 5 illustrates an example diagram representing trial state-based measurements using entanglement via quantum circuits in accordance with one or more embodiments described herein.

Turning to FIGS. 4-6, with the classical optimization problem mapped to a Hamiltonian optimization problem, short depth circuits that depend on a set of continuous parameters can be generated. In general and as described herein, this is accomplished by taking an initial guess of a set of continuous parameters (block 402) that generates a particular state (block 404), and writing that Hamiltonian as a sum of Pauli-Z terms. In general, this is accomplished by obtaining state information and averaging, that is, sample from that state/average those Paulis (blocks 406 and 408, looping back to block 404 for some number of iterations), or in other words, measure those Paulis to obtain an average value and report that average measurement back (block 410).

Turning to trial states with reference to FIG. 5, unitary state entanglement ($U_{ent}$) can be represented on a quantum computer, such as represented in the example short depth circuit 500. The short depth circuit can be represented on a superconducting quantum computer, such as with entangling gates 502 and 504. These entangling gates are cross-resonance gates that talk to multiple qubits, and may be subject to certain parameters, such as a depth parameter (how many cross resonance gate interactions are wanted) and so forth. Note that such classical parameters thus specify a family of states $U_{ent}$; further details are provided with reference to equations 8, 9 and 10 and their accompanying text. Unitary entanglement $U_{ent}$ thus comes from cross-resonance gates (generally defined in equations 10, 11 and 12) and a superconducting quantum computing chip. It should be noted that this is only a non-limiting example; other gates that entangle can be alternatively used.

Returning to FIG. 4, block 408 that measures the energy is generally described the flow diagram for measuring the energy of FIG. 6. As described herein, at block 602 a Hamiltonian is given as combination of Pauli terms ($P_\alpha$'s) and real numbers ($h_\alpha$'s). For each of the alphas ($\alpha$'s) (blocks 604 and 608), expectation values of the individual Paulis are measured (block 606) and then added up (block 610) to obtain a final energy (block 612).

As can be seen, there is a set of Pauli operators paired with coefficients. A parameter is chosen and the Pauli-operator outcome is measured on individual quantum states, multiple times until the average is obtained, with the $h_\alpha$'s weights (the real number in front of the expectation value) summed to total energy. The output is the sum of those individual measurements. Additional details are set forth with reference to equations 15 and 16 and their accompanying text.

Once provided with an energy value that depends on the initial parameters fed into a quantum device, a full minimization scheme may be performed. To summarize, consider a set of trial states $|\psi\rangle$ that are generated by the physical time evolution of the quantum hardware interspersed with control pulses. These trial states $\Omega$ can be referred to as hardware efficient trial states. The controlled physical time evolution is universal in that any state in $C^d$ in principle can be generated. The quantum computer is used to sample from the optimal state $|\psi^*\rangle$ in the computational basis $|x\rangle$ to obtain bit strings x that provide a good approximation to the binary optimization problem, and to measure the quantum cost function $E = \langle \psi | H_C | \psi \rangle$ for the trial states $|\psi\rangle \in \Omega$ in order to feed it to a classical optimization routine.

FIG. 7 illustrates one such classical optimization loop, starting with an initial guess of parameters, to provide the Hamiltonian (block 702) with the set of control parameters (block 704). Block 706 provides an initial guess of control parameters. Blocks 704, 708, 710 and 712 describe a measurement loop to get the energy value out as in FIG. 4; in the loop, this energy value gets mapped to a new proposed update set of the control parameters, and so on until convergence to a desired level is reached. Note that the new set of control parameters depends on which classical optimization routine is being used, e.g., simulated annealing, stochastic gradient or the like, for continuous variables.

In general block 710 checks for convergence in that the energy does not significantly change (although the experiment may continue to run). At convergence, block 714 output the energy value along with its associated, corresponding optimal control parameters. This minimizes locally for one given Hamiltonian and finds the control parameters based on an initial guess of optimal control parameters.

Figure 8:
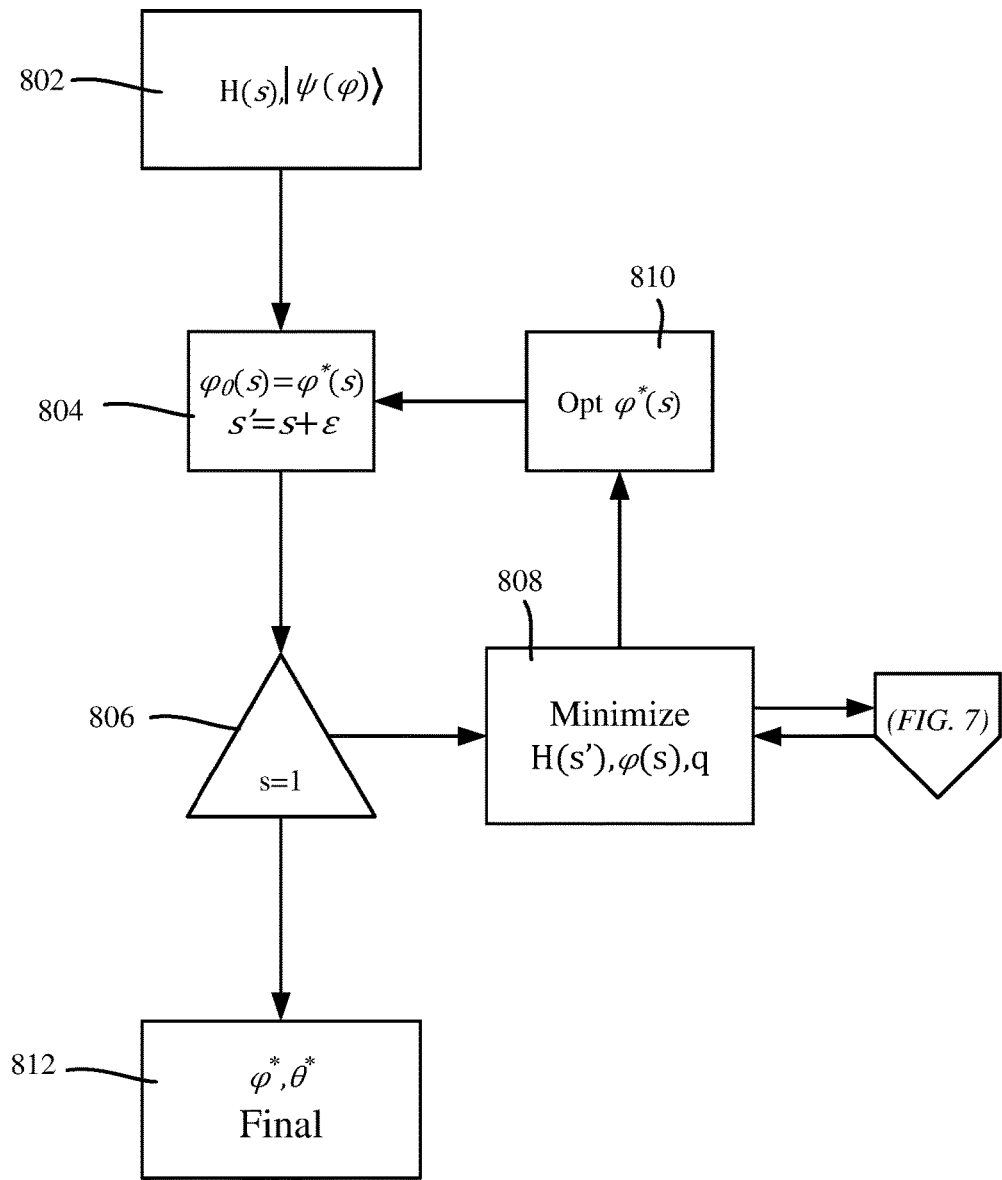
FIG. 8 illustrates an example diagram representing cost function deformation to produce final states representing a cost function solution in accordance with one or more embodiments described herein.

Turning to cost function deformation as generally represented in FIG. 8, it is noted that although this quantum optimization problem is dependent in part on a classical optimizer, the optimization problem is different from the original classical problem C because it is only over a class of quantum states with (possibly) fewer parameters. FIG. 8 starts (block 802) with choosing a family of Hamiltonians, including one in which the answer is known. That is, the operations start with a simple (trivial) Hamiltonian and correctly chosen control parameters such that the initial guess is very exact. From that trivial Hamiltonian and the correct initial guess, the operations gradually deform the Hamiltonian until reaching the Hamiltonian for which the minimum is being sought, corresponding to the classical optimization problem cost function to be solved (by sampling from the quantum optimization problem).

FIG. 8 minimizes the family of Hamiltonians (similar to FIG. 7) from s=0 to 1 as increased by ε) by entering (block 804) with new control parameters found for the previous s value at (s−ε) and deforming the value found (until s=1, block 806). In other words, the control parameters are entered and minimized (e.g., via the loop in FIG. 7), entering initially with $\varphi_0$, $\theta_0$ and the deformed Hamiltonian H performing this local optimization loop (blocks 804, 806, 808 and 810).

Thus, described herein is deforming a family of Hamiltonians starting from a trivial Hamiltonian for which the ground state is known, and tracking the ground state as deformation occurs until a desired point is reached. By starting with a set of known parameters, and deforming the Hamiltonian that depends on these parameters to find the next set of optimal parameters, the next set can be fed into a next optimization loop for the next deformed Hamiltonian until reaching the desired Hamiltonian. At that point, the final optimal parameters for this final Hamiltonian are known, and can be used to sample to obtain the correct bit string.

Thus, a family of cost functions $E(s)=\langle\psi|H(s)|\psi\rangle$ for $s\in[0,1]$ can be deformed from a trivial trial state for which the optimal state $|\psi_{s=0}^*\rangle\in\Omega$ and $E(0)=\langle\psi_0^*|H(0)|\psi_0^*\rangle$ is known. As an example, consider the family of Hamiltonians $$H(s) = sH_C - (1-s)\sum_{i=1}^{n} X_i$$

for n bits, and the Pauli spin operator $$X = \begin{bmatrix} 0 & 1 \\ 1 & 0 \end{bmatrix}$$

acting on every single site i. Described herein is minimizing the cost function for parameters s, starting at $s_0=0$ and then using the optimal $|\psi_s^*\rangle$ as the next starting state for the next optimization at $s_{k+1}=s_k+\varepsilon$ until s=1 is reached and the optimizer of $E(1)=\langle\psi|H_C|\psi\rangle$ is found. At every step the quantum hardware is used to evaluate the real valued cost function $E(s)=\langle\psi|H(s)|\psi\rangle$.

Note that access to the quantum system used for the optimization, and access to the method for optimizing the quantum cost function may be provided through the internet. For example, and an interface may be provided so that this routine can be accessed in the cloud.

Figure 9:
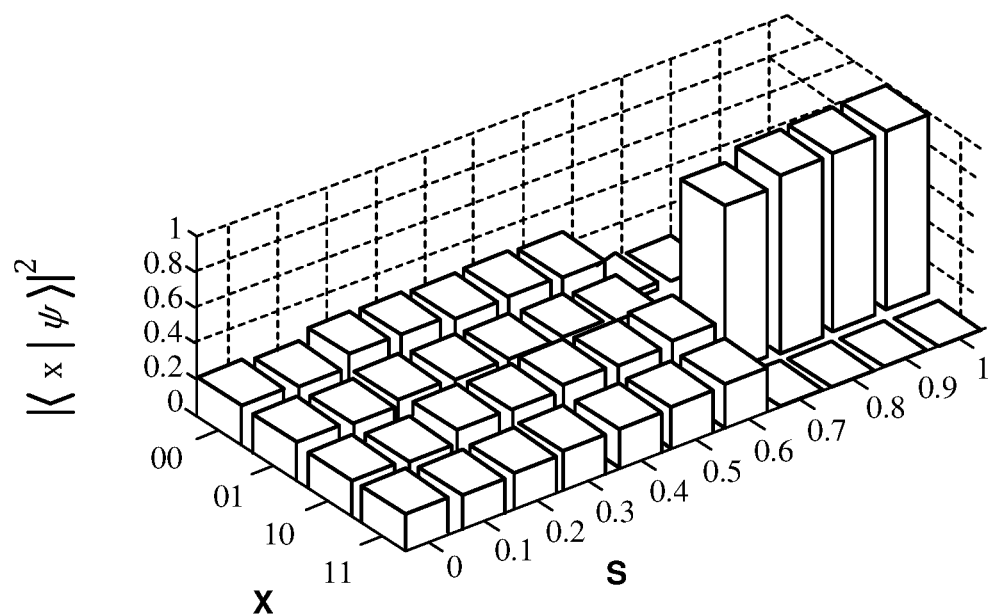
FIGS. 9-11 illustrates example graphs showing optimized measurement probabilities obtained by gradually deforming a function corresponding to a combinatorial optimization problem (MaxCut) for vertex sets of two, three and four vertices, respectively in accordance with one or more embodiments described herein.
Figure 9:
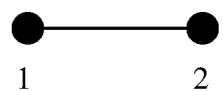
Figure 10:
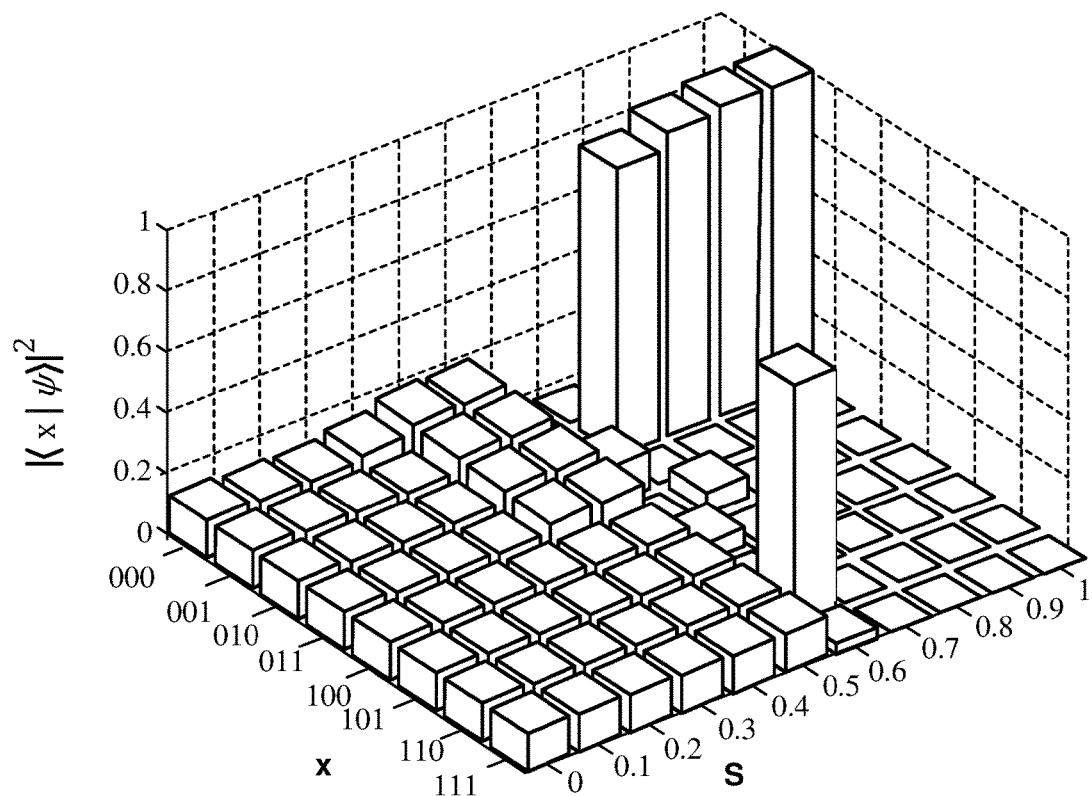
Figure 10:
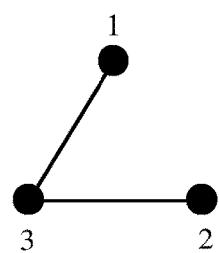

A numerical investigation has been performed for small system sizes and a depth d=2 circuit with two entangling steps $U_{ent}$ and and two sets of single qubit rotations $U_{loc}^n$ for the Hamiltonian family in Eq. (18). For a graph with two vertices and the corresponding Hamiltonian of N=2 qubits, the optimized measurement probabilities $\langle z_1, \ldots, z_N|\psi(\vec{\theta}^*_s, \vec{\varphi}^*_s)\rangle$, are depicted in FIG. 9 for $s\in[0,1]$. The example of a three vertex graph is shown in FIG. 10, and for a four vertex graph in FIG. 11. The local parameters were optimized using a classical simulated annealing technique.

Figure 11:
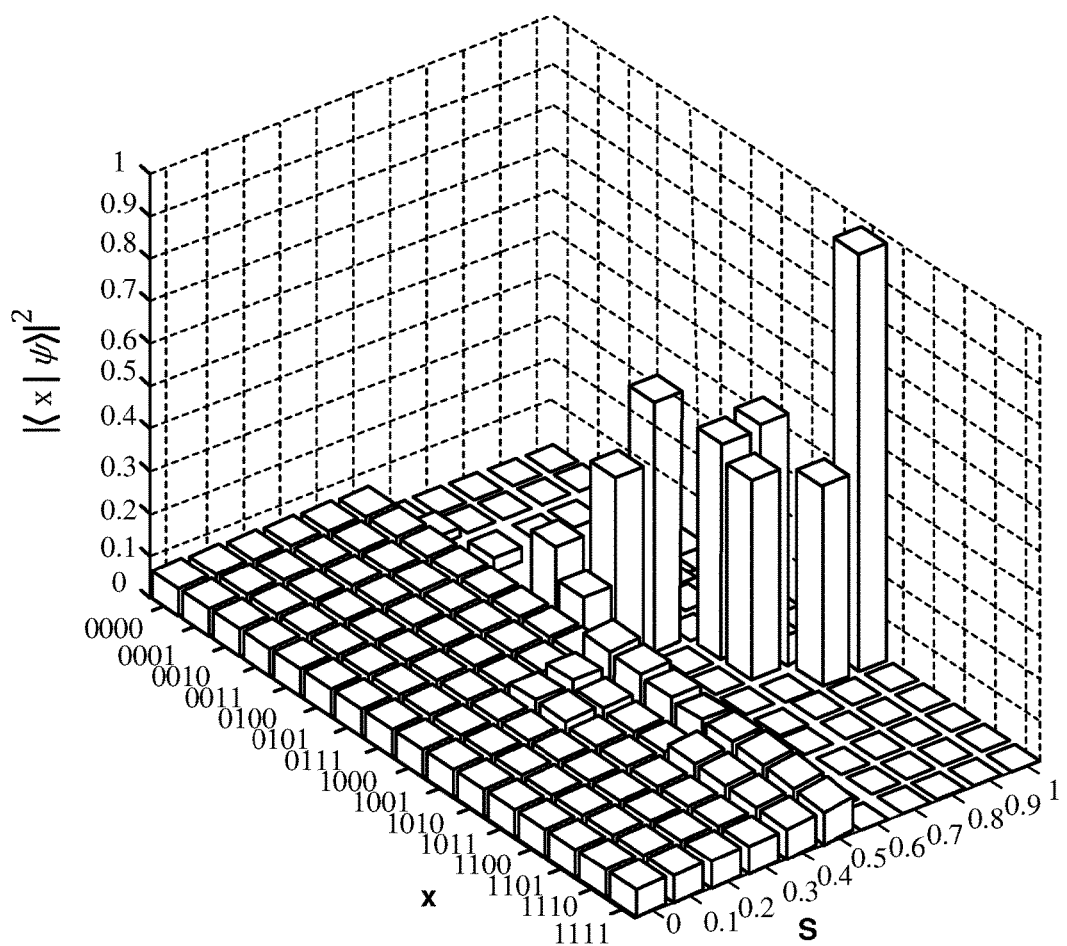
Figure 11:
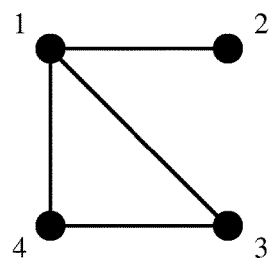

Note that FIGS. 9-11 are for a system from two to four cubits on instances of a combinatorial optimization problem MaxCut, described below. In general, the graphs represent encoding in a particular bit string, starting with initial superposition—the distribution from which to sample minimizing bit strings, gradually deforming the function until it starts concentrating with the correct bit-string in the end. This is exemplified by the early measurements providing mostly uniform results, but as the cost function deforms towards the desired one, the concentration of weights can be seen.

Turning to additional details including equations, in binary combinatorial optimization problems, the cost function $C:\{0,1\}^n\rightarrow\mathbb{R}$ is typically written in the canonical form $$C(x) = \sum_{Q\subset[n]} w_Q \prod_{i\in Q} x_i \tag{1}$$

for $x_i\in\{0,1\}$ and $w_Q\in\mathbb{R}$ where typically the size of set Q is small relative to n. A task is to find the n-bit string $x\in\{0,1\}^n$ for which C(x) is extremal. A problem may seek to optimize C with additional constraints on the bit string. To give an example, consider the "Traveling Salesman Problem" given below. Additional constraints on the variable x can be stated in terms of a constraint function $$g_i: \{0,1\}^n \rightarrow \mathbb{R}, \text{ for } 1\ldots k. \tag{2}$$

for which $$g_i(x)=0, \text{ for}=1\ldots k. \tag{3}$$

to enforce the constraint. It is well known that such constraints can be enforced in terms of a modified cost function $C_A(x)=C(x)+\Sigma_{i=1}^k A_i g_i(x)$, where the $A_i\in\mathbb{R}^+$ are chosen so that $A_i>>\Delta C$ and $\Delta C$ indicates the smallest difference between the discreet values of C.

This classical problem can be cast in terms of a quantum Hamiltonian $H_C$ associated to the cost function $C_\lambda(x)$, that is diagonal in the computational basis $|x\rangle$.

$$H_C = \sum_{x\in\{0,1\}^n} C_\lambda(x)|x\rangle\langle x|. \tag{4}$$

To represent the optimization as a quantum Hamiltonian it is convenient to express the optimization as a linear combination of Pauli Z terms. This can be achieved immediately when $C_\lambda(x)$ is a polynomial of low degree polynomial in x. If this is the case, a simple substitution for every binary variable as $x_i = 2^{-1}(1-Z_i)$ is sufficient. This mapping is illustrated in FIG. 3 as set forth herein.

EXAMPLE A

Weighted MaxCut

MaxCut is an NP-complete problem, with applications in clustering, network science, and statistical physics. The formal definition of this problem is the following:

Consider a n-node non-directed graph G=(V,E) where $|V|=n$ with edge weights $w_{ij}>0$ for $(i,j) \in E$. A cut is defined as a partition of the original set V into two subsets. The cost function to be optimized is in this case the sum of weights of edges connecting points in the two different subsets. For $x_i \in \{0,1\}$ or $x_i=1$ to each node i one tries to maximize the global cost function $$C(x) = \sum_{(i,j) \in E} w_{ij} x_i (1 - x_j), \quad (5)$$

with $w_{ij}$ real. To provide a mapping to an Ising Hamiltonian, this can be done with the assignment $x_i = 2^{-1}(1-Z_i)$. The Hamiltonian cost Hamiltonian $H_c$ is then given by $$C(Z) = \sum_{i<j} \frac{w_{ij}}{2}(1-Z_i)(1+Z_j) + \sum_i w_i(1-Z_i)/2 = \quad (6)$$

$$-\frac{1}{2}\left(\sum_{i<j} w_{ij} Z_i Z_j + \sum_i w_i Z_i\right) + const$$

where $const = \sum_{i<j} w_{ij}/2 + \sum_i w_i/2$. Because this constant is not relevant, the weighted MaxCut problem is equivalent to minimizing the Ising Hamiltonian $$H = \sum_i w_i Z_i + \sum_{i<j} w_{ij} Z_i Z_j. \quad (7)$$

EXAMPLE B

Traveling Salesman Problem

To illustrate the mapping of optimization problems with constraints, discussed herein is the Traveling Salesman Problem (TSP). The TSP on the nodes of a graph asks to find the shortest Hamiltonian cycle in a graph G=(V,E) with $n=|V|$ nodes and distances, $w_{ij}$ (distance from vertex i to vertex j). A Hamiltonian cycle is described by $N^2$ variables $x_{i,p}$, where i represents the node and p represents its order in a prospective cycle. The decision variable takes the value 1 if the solution occurs at node i at time order p. Every node can only appear once in the cycle and for each time a node has to occur. This amounts to the two constraints $$\sum_i x_{i,p} = 1 \ \forall \ p$$

-continued $$\sum_p x_{i,p} = 1 \ \forall \ i$$

For nodes in the prospective ordering, if $x_{i,p}$ and $x_{j,p+1}$ are both 1, then there should be an energy penalty if $(i,j) \notin E$ (not connected in the graph). The form of this penalty is $$\sum_{(i,j) \notin E} \sum_p x_{i,p} x_{j,p+1} > 0,$$

where it is assumed the boundary condition of the Hamiltonian cycle, $(p=N) \equiv (p=0)$. However, here it will be assumed a fully connected graph that does not include this term. The distance that needs to be minimized is $$C(x) = \sum_{(i,j)} w_{ij} \sum_p x_{i,p} x_{j,p+1}.$$

To account for these additional constraints the cost function is modified and put together in a single objective function to be minimized $$C(x) = \sum_{i,j} w_{ij} \sum_p x_{i,p} x_{j,p+1} + A \sum_p \left(1 - \sum_i x_{i,p}\right)^2 + A \sum_i \left(1 - \sum_p x_{i,p}\right)^2,$$

where A is a free parameter. The parameter A needs to be large enough so that these constraints are respected. One way to do this is to choose A such that $A > \max(w_{ij})$. Furthermore, since the problem allows the salesperson to return to the original city, without loss of generality, it is possible to set $x_{00}=1$, $x_{i0}=0 \ \forall i \neq 0$, and $x_{0p}=0 \ \forall p \neq 0$. By doing this, the objective functions becomes $$C(x) = \sum_{i,j=1}^{N-1} w_{ij} \sum_{p=1}^{N-1} x_{i,p} x_{j,p+1} + \sum_{j=1}^{N-1} w_{0j} x_{j,1} \sum_{i=1}^{N-1} w_{i0} x_{i,N-1} +$$

$$A \sum_{p=1}^{N-1} \left(1 - \sum_{i=1}^{N-1} x_{i,p}\right)^2 + A \sum_{i=1}^{N-1} \left(1 - \sum_{p=1}^{N-1} x_{i,p}\right)^2.$$

The unconstrained problem can be mapped to a quantum Hamiltonian with the substitution $x_i = 2^{-1}(1-Z_i)$, and the solution will be found by minimizing an Ising-type Hamiltonian.

Thus, the problems considered herein can be mapped to a problem Hamiltonian H. It is a goal to either determine a good approximation to the value of the ground state energy $E_{min}$ or sample from the short depth approximation $|\psi_{min}\rangle$ of the ground state of the Hamiltonian. An exact estimation of $E_{min}$ or an exact preparation of $|\psi_{min}\rangle$ will in general not be possible based one complexity theoretic arguments. Hence the focus herein is on algorithms that prepare approximations to both.

A coherently controllable quantum mechanical system is used, such as for example a superconducting chip with N qubits to prepare a quantum state $$|\psi(\vec{\theta},\vec{\varphi})\rangle = U_{ent}^{(d)}(\varphi_d) U_{loc}^{(d)}(\theta_d) \ldots U_{ent}^{(1)}(\varphi_1) U_{loc}^{(1)}(\theta_1)|0^N\rangle, \quad (8)$$

by applying a circuit of d repeated drift steps as depicted in FIG. 5 that is comprised of local single qubit rotations $$U_{loc}^{(t)}(\theta_t) = \otimes_{i=1}^n U(\theta_{i,t}) \text{ and } U(\theta_{i,t}) \text{ in } SU(2), \quad (9)$$

parameterized by $\vec{\theta} \in \mathbb{R}^m$.

Furthermore entangling interactions can be applied $$U_{ent}^{(t)}(\varphi_t) = \exp(iK(\varphi_t)), \text{ where } K(\varphi_t) = \sum_\alpha J_\alpha(\varphi_t)\sigma(\alpha), \quad (10)$$

that depend on some real parameters $\vec{\varphi} \in \mathbb{R}^m$ for every $\sigma(\alpha) \in \mathcal{P}_N$. There exist multiple choices for the entangling unitaries $U_{ent}^{(t)}(\varphi_t)$; the trial states considered can be seen as a generalization of the known Quantum-Approximate-Optimization-Algorithm states, where $U_{ent}^{(t)}(\varphi_t) = \exp(i\varphi_t H_C)$ and additional restrictions are placed on $U_{loc}^{(t)}(\theta_t)$, such that $U(\theta_{i,t}) = \exp(i\theta_t x_i)$. Note that these restrictions can be relaxed to consider more general Ising type coupling graphs for $U_{ent}^{(t)}(\varphi_t)$ that do not necessarily need to correspond to the problem Hamiltonian $H_C$.

Note that these interactions are not native to the superconducting circuit considered. As an example to illustrate the method, and not by way of limitation, consider applying cross-resonance gates, which implies that the entangling Unitary between qubit k and l is generated by the two-local effective Hamiltonian is given by $$h_{k,l} = aZ_k + bZ_l + c_{k,l}Z_k Z_l + d_{k,l}(1-e_{k,l})X_k + d_{k,l}e_{k,l}X_k Z_l. \quad (11)$$

The parameters a, b, $c_{k,l}$, $d_{k,l}$, $e_{k,l}$ are determined by the actual hardware of the superconducting circuit. This means a natural drift evolution K, for example, is given by $$K(\theta_t) = \sum_{k<l} J_{k,l}(\theta_t) h_{k,l}, \quad (12)$$

where the $J_{k,l}(\theta_t)$ can be tuned by experiment.

This "bang bang" controlled state corresponds to a most general state that can be prepared on the physical quantum hardware if limited to a maximal set of K subsequent iterations of applying control pulses and permitted drift times to generate entanglement (FIG. 5). For the general approach to the known Quantum-Approximate-Optimization-Algorithm the interaction $Z_l Z_m$ has to be effectively generated from $h_{k,l}$, by applying bang bang control pulses, which extends the circuit depth and allows for the introduction of additional coherent errors by restricting the variation over the control parameters. In contrast, described herein is optimizing the control pulses in the presence of the native drift Hamiltonian directly. Because it is known that the set of drifts $\{h_{kl}\}$ together with the single control pulses $U_{loc}(\theta)$ are universal, any state can be prepared this way with sufficient circuit depth.

As described herein, optimization problems can be mapped to quantum Ising-type models. In order to perform an adiabatic deformation of the cost function as described herein, more general Hamiltonians need to be considered. That is, ground states of Hamiltonians that are not necessarily diagonal in the Z-basis need to be constructed. In general, assume that the Hamiltonian can be decomposed into a sum of a few multi-qubit Pauli operators, $$H = \sum_\alpha h_\alpha \sigma(\alpha) \text{ with } h_\alpha \in \mathbb{R}, \sigma(\alpha) \in \mathcal{P}_N. \quad (13)$$

By way of example for illustration purposes and not by way of limitation, consider the Pauli decomposition for the transverse Ising model with arbitrary two body spin couplings $$H(s) = (1-s)\sum_{k=}^n X_k + \sum_{i<j} J_{ij} Z_i Z_j. \quad (14)$$

Note that this is not limited by the connectivity of the Hamiltonian H and can consider completely non-local Pauli operators $P_\alpha$, because it is not planned to implement the Hamiltonian directly in hardware, but rather to measure the individual Pauli operators on a set of experimentally controlled trial states.

The energy of H can then be measured directly in by first preparing $|\psi(\vec{\theta},\vec{\varphi})\rangle$ and then sampling the expectation values for the individual $\sigma(\alpha)$ for all the $\alpha$'s. The expectation value is then computed as $$E(\vec{\theta},\vec{\varphi}) = \langle\psi(\vec{\theta},\vec{\varphi})|H|\psi(\vec{\theta},\vec{\varphi})\rangle. \quad (15)$$

The expectation value of the Hamiltonian from the individual Pauli-measurements $\langle\psi(\vec{\theta},\vec{\varphi})|\sigma(\alpha)|\psi(\vec{\theta},\vec{\varphi})\rangle$ is evaluated as $$\langle\psi(\vec{\theta},\vec{\varphi})|H|\psi(\vec{\theta},\vec{\varphi})\rangle = \sum_\alpha h_\alpha \langle\psi(\vec{\theta},\vec{\varphi})|\sigma(\alpha)|\psi(\vec{\theta},\vec{\varphi})\rangle. \quad (16)$$

Consider M independent and identically distributed samples of the measurement by a repeated prepare and measurement set up (FIG. 4), where the variational trial state in Eq. 8 is prepared M times and the Pauli-operator measured directly. To obtain a bound on the number M of samples, consider asymptotic statistics and estimate the confidence interval by the variance. This means that any measurement that is to reproduce the expectation value $E(\vec{\theta},\vec{\varphi})$ up to error $E$ should prepare at least $M \geq \mathcal{O}(\varepsilon^{-2} \cdot 2\text{Var}_E)$ samples, where $\text{Var}_E$ indicates the variance of the energy of the measurement scheme.

A classical optimization routine is needed that will converge to the optimal parameter values $(\vec{\theta}^*, \vec{\varphi}^*)$. Several options exist that can be applied. By way of example and not limitation, one approach is to perform simulated annealing for the cost function $E(\vec{\theta},\vec{\varphi})$. Other alternatives include the SPSA [Span] gradient decent algorithm or Nelder-Mead [NM] algorithm. This would constitute a direct approach to minimizing the energy of $|\psi(\vec{\theta},\vec{\varphi})\rangle$ with respect to the Hamiltonian H. This corresponds to classical optimization routine with the cost function $E(\vec{\theta},\vec{\varphi})$ that will be evaluated on a quantum computer directly. This approach estimates the optimal energy approximation $E(\vec{\theta},\vec{\varphi})$ of $E_{min}$ and provides the control parameters to prepare the state $|(\vec{\theta}^*,\vec{\varphi}^*)\rangle$, which is a best estimate for the true state $|\psi_{min}\rangle$.

A direct minimization approach follows the steps:

1. For t=0 provide initial parameters $(\vec{\theta}^0, \vec{\varphi}^0)$
2. Repeat the following steps M-times:
   (a) Prepare the state $|\psi(\vec{\theta}^t, \vec{\varphi}^t)\rangle$ on the quantum computer, and measure a Pauli $\sigma(\alpha)$ on this state.
   (b) Then add the samples to obtain the expectation value $E(\vec{\theta}^t, \vec{\varphi}^t)$.
3. Then set t→t+1 propose a new set of parameters $(\vec{\theta}^{t+1}, \vec{\varphi}^{t+1})$ based on a classical optimization scheme
4. Repeat until converged to the optimal values $(\vec{\theta}^*, \vec{\varphi}^*)$.

However, there may be scenarios where it can be favorable to consider a less direct route. A different approach, for instance, is the possibility of following the adiabatic transformation of a virtual Hamiltonian. Note that the classical optimization problem in minimizing $E(\vec{\theta}, \vec{\varphi})$ directly is most likely not simpler than minimizing the initial cost function directly. In this context described is a deformation of the cost function depending on a parameter $s \in [0,1]$. That is, a family of Hamiltonians H(s) is considered that interpolate between the initial Hamiltonian $H(0)=H_{trivial}$ to the final Hamiltonian $H(1)=H_C$. A possible deformation can for example be given in terms of $$H(s)=(1-s)H_{trivial}+sH_C. \quad (17)$$

Note that other choices for H(s) are possible as long as the conditions for H(0), H(1) are met. The choice of $H_{trivial}$ is made so that optimal set of parameters $(\vec{\theta}^*, \vec{\varphi}^*)|_{s=0}$ for the ground state of the initial state is known, so that the ground state $|G_0\rangle = |\psi((\vec{\theta}^*, \vec{\varphi}^*))\rangle|_{s=0}$ with $H_{trivial}|G_0\rangle = E_{min}(0)|G_0\rangle$ can be constructed easily.

To provide a concrete example for non-limiting illustration purposes, consider the MaxCut problem for a graph G=(V,E) with vertex set V and edge set G. The problem can be mapped to minimizing the energy of an Ising Hamiltonian $H_C$ as in Eq. (7). As the trivial initial Hamiltonian choose $H_{trivial} = -\Sigma_{i \in V} X_i$, i.e., the transverse field model on the graph G. A simple interpolating family is then given by $$H_{MaxCut}(s) = -(1-s)\sum_{i \in V} X_i + s\sum_{(i,k) \in E} J_{i,k} Z_i Z_k. \quad (18)$$

The initial state can be $|G_0\rangle = |+\rangle^{\otimes n}$. This choice can be readily realized by setting the interaction Hamiltonian parameters $\vec{\varphi}$ in the trial state of Eq. (8) so that all K=0, and the single qubit rotation parameters $\vec{\theta}$ so that the first layer of Unitaries is given by $H^{\otimes n}$.

The Hamiltonian family H(s) for $s \in [0,1]$ leads to a family of classical cost functions E(s) that are evaluated on the quantum computer by measurement as described above with reference to FIGS. 4 and 5. The cost function $$E_s(\vec{\theta}, \vec{\varphi}) = \langle \psi(\vec{\theta}, \vec{\varphi})|H(s)|\psi((\vec{\theta}, \vec{\varphi}))\rangle \quad (19)$$

interpolates between the ground state energy approximations $E_0, E_1$ and updates parameters $(\vec{\theta}^*, \vec{\varphi}^*)|_s$ along the deformed path minimizing the parameters at every step s using the classical minimizers described with reference to FIG. 7.

The method starts with the initial parameters $(\vec{\theta}, \vec{\varphi})|_{s=0}$, and then follows a schedule for T values $0=s_0 < s_1 < s_2 < \ldots < s_T = 1$ of the parameter s, using the optimal value $(\vec{\theta}^*, \vec{\varphi}^*)|_{s_i}$ as the starting point for the next minimization. That is 1. Choose T values $0=s_0 < s_1 < s_2 < \ldots < s_T = 1$, and prepare the initial optimal parameters for $s_0=0$ as $(\vec{\theta}^*, \vec{\varphi}^*)|_{s=0}$
2. For $1 \le t \le T$ repeat the following
   (a) Provide the Hamiltonian $H(s_t)$
   (b) Set the initial parameters $(\vec{\theta}, \vec{\varphi}) = (\vec{\theta}^*, \vec{\varphi}^*)|_{s_{t-1}}$
   (c) Run the optimization method (FIG. 1) for $H(s_t)$ and $|\psi(\vec{\theta}, \vec{\varphi})\rangle$
3. Report the optimal parameters $(\vec{\theta}^*, \vec{\varphi}^*)|_{s_T}$ and energy $E_{s_T}$.
4. Prepare the state $|\psi(\vec{\theta}^*_{s_T}, \vec{\varphi}^*_{s_T})\rangle$ and sample multiple times in the computational basis to obtain a good bit-string that provides an energy of $H_C$ comparable to $E_{s_T}$.

Introducing such a deformation is expected to improve the convergence of the classical optimization method, because of performing a warm start in the parameters $(\vec{\theta}, \vec{\varphi})$. Consider the family of Hamiltonians $H_{MaxCut}(s)$ in Eq. (18), for $s \in [0,1]$. Note that other solutions propose a fully classical method to emulate noisy quantum annealing. This classical model can be obtained, within the framework described herein, by considering the very restricted class of product trial states:

$$|\psi(\vec{\theta}, \vec{\varphi})\rangle^1 = \bigotimes_{i=1}^{n} e^{i\frac{\theta_i}{2}Y_i}|0^n\rangle = \bigotimes_{i=1}^{n}\left(\sin\left(\frac{\theta_i}{2}\right)|0\rangle - \cos\left(\frac{\theta_i}{2}\right)|1\rangle\right) \quad (20)$$

The technology described herein provides that $E_s(\vec{\theta}, \vec{\varphi})$ can be computed classically, and reduces to the cost function $$E_s(\vec{\theta}, \vec{\varphi}) = -(1-s)\sum_{i=1}^{n}\sin(\theta_i) + s\sum_{i,k}^{n} J_i \cos(\theta_i)\cos(\theta_k). \quad (21)$$

This cost function corresponds to known classical models. In contrast, the technology described herein corresponds to considering variational quantum circuits as trial wave functions $|\psi(\vec{\theta}, \vec{\varphi})\rangle$ that have higher depth and actually use entanglement.

As can be seen, described herein is a concrete instantiation of short depth circuits for combinatorial optimization problems. The technology may be mapped to a classical optimization problem for continuous parameters, with results obtained via a deformation from a known solution in that space. Cross resonance gates generate that state; this basically tunes the state so that it is within the correct class of states before sampling. Thus, by minimizing a classical cost function and applying the circuit to generate output by measuring an energy function (which is the cost function on that circuit), the technology attempts to minimize parameters on the circuit, via a classical minimization problem. Once known, samples are drawn, which are approximate solutions to the combinatorial optimization problem to solve.

Figure 12:
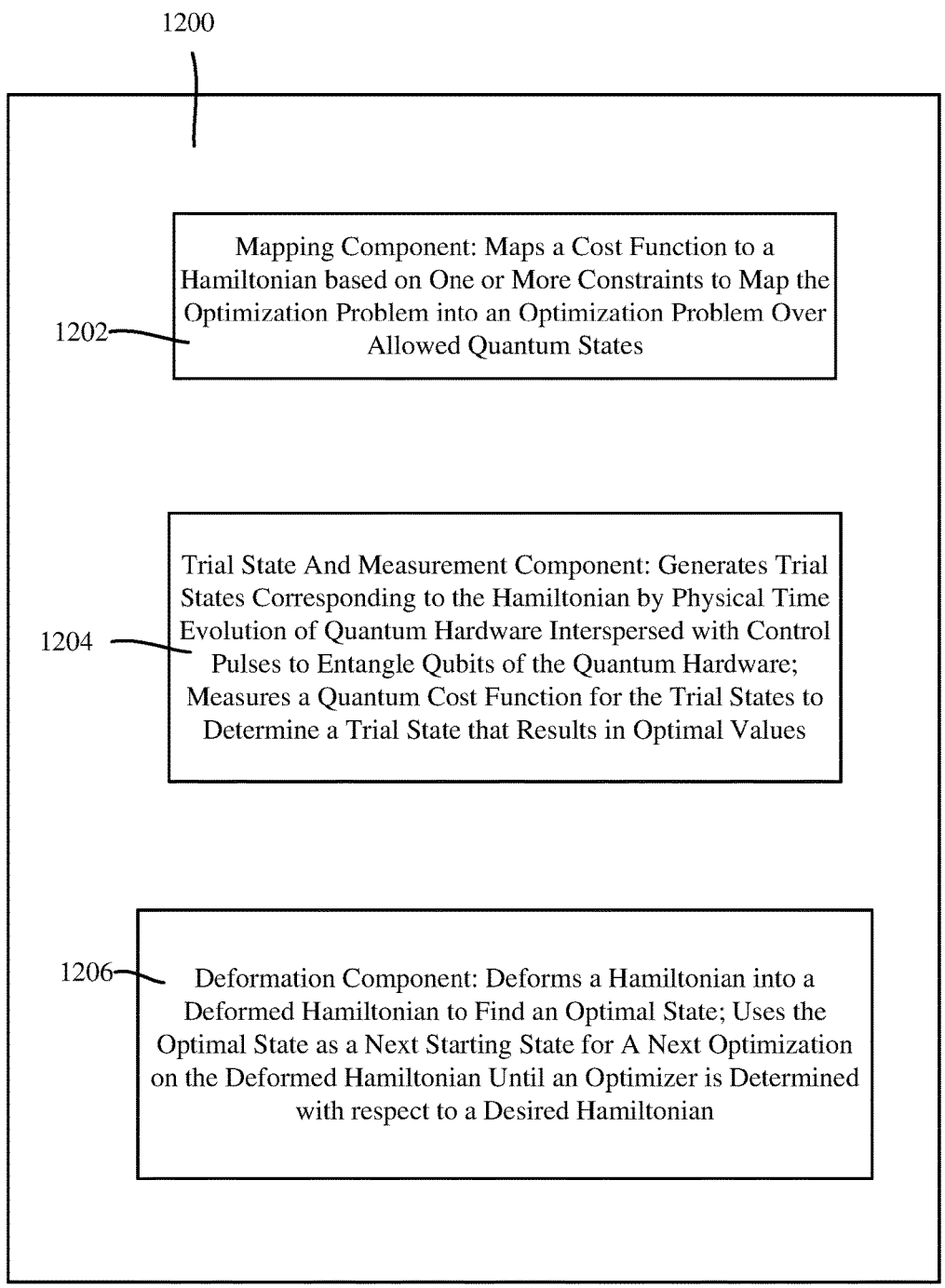
FIG. 12 illustrates a block diagram of an example, non-limiting system that facilitates optimization of an optimization problem in accordance with one or more embodiments described herein

FIG. 12 is a representation of a system 1200 that facilitates solving an optimization problem, e.g., via a memory that stores computer executable components and a processor that executes computer executable components stored in the memory. Block 1202 represents a mapping component that maps a cost functions to a Hamiltonian based on one or more constraints to map the optimization problem into an optimization problem over allowed quantum states (e.g., by mapping component 104). Block 1204 represents a trial state and measurement component that generates trial states corresponding to the Hamiltonian by physical time evolution of quantum hardware interspersed with control pulses to entangle qubits of the quantum hardware, and that measures a quantum cost function for the trial states to determine a trial state that results in optimal values (e.g., by trial state and measurement component 107). Block 1206 represents a deformation component that deforms a Hamiltonian into a deformed Hamiltonian to find an optimal state, and uses the optimal state as a next starting state for a next optimization on the deformed Hamiltonian until an optimizer is determined with respect to a desired Hamiltonian (e.g., by deformation component 118).

Aspects can comprise a sampling component that samples from the optimal state corresponding to the optimizer to obtain one or more approximations to the combinatorial optimization problem. Other aspects can comprise an interface that interacts with the mapping component and outputs the trial state that results in the optimal values. The trial state and measurement component can measure individual Pauli operators on the trial states.

Figure 13:
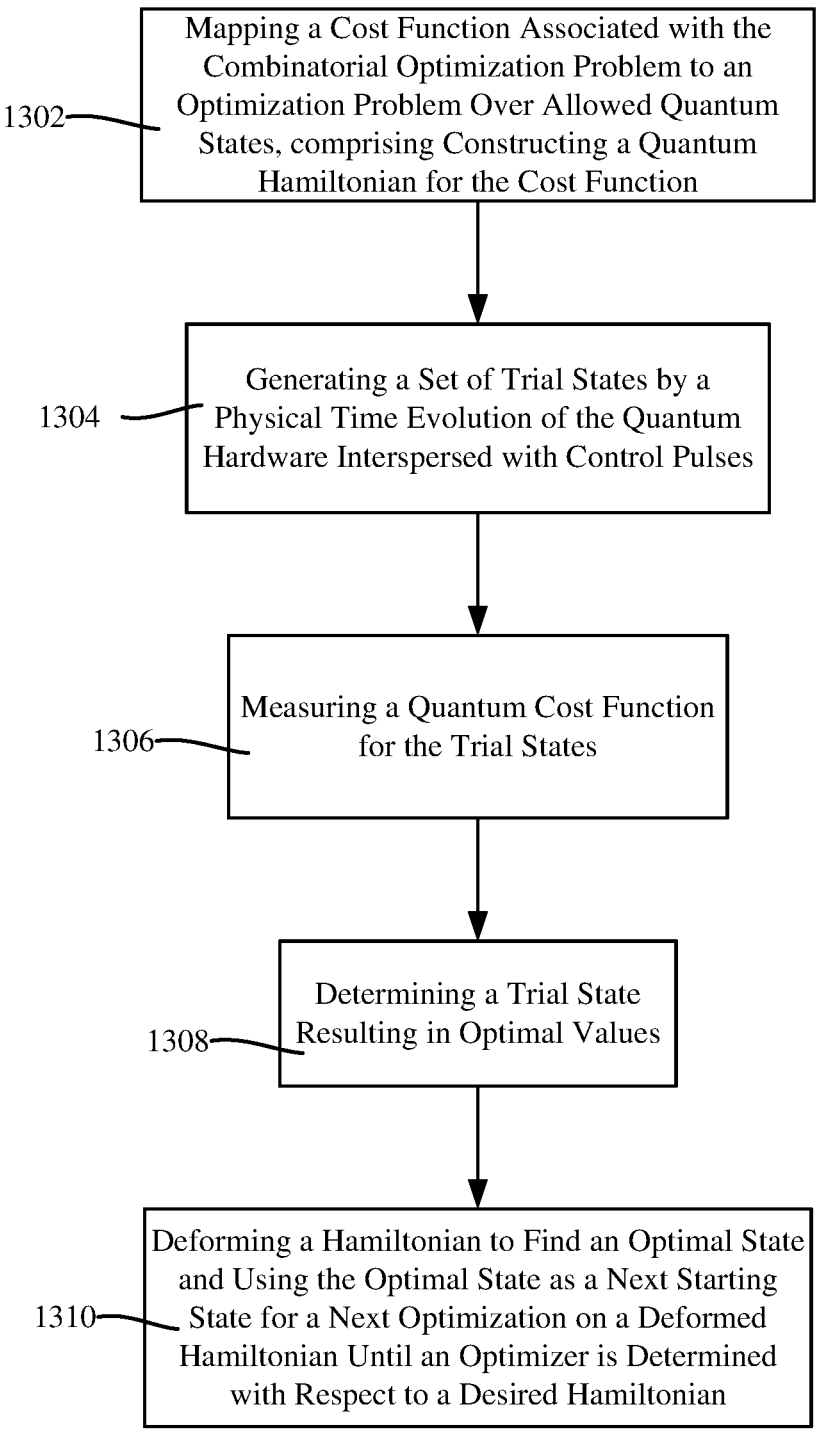
FIG. 13 illustrates a flow diagram of an example, non-limiting computer-implemented method facilitating optimization of an optimization problem in accordance with one or more embodiments described herein.

FIG. 13 is a flow diagram representation of example operations generally directed towards facilitating solving a combinatorial optimization problem using quantum hardware. Aspects comprise mapping (block 1302) a cost function associated with the combinatorial optimization problem to an optimization problem over allowed quantum states, comprising constructing a quantum Hamiltonian for the cost function. Other aspects comprise generating (block 1304) a set of trial states by a physical time evolution of the quantum hardware interspersed with control pulses, measuring (block 1306) a quantum cost function for the trial states, determining (block 1308) a trial state resulting in optimal values, and deforming (block 1310) a Hamiltonian to find an optimal state and using the optimal state as a next starting state for a next optimization on a deformed Hamiltonian until an optimizer is determined with respect to a desired Hamiltonian.

Aspects can comprise generating the set of trial states by the physical time evolution of quantum hardware interspersed with control pulses comprises using the control pulses to generate entanglement.

Constructing the quantum Hamiltonian for the cost function can comprise constructing a quantum Hamiltonian diagonal. Constructing the quantum Hamiltonian for the cost function can comprise expressing a quantum Hamiltonian as a linear combination of Pauli Z-terms.

Mapping the cost function associated with the binary combinatorial optimization problem can comprise mapping the cost function to a qubit representation on the approximate quantum computer. Measuring the quantum cost function for the trial states can comprise measuring individual Pauli operators on the trial states.

Aspects can comprise sampling from the optimal state corresponding to the optimizer to obtain approximations to the combinatorial optimization problem. The combinatorial optimization problem can comprise a binary combinatorial optimization problem, and aspects can comprise sampling from the optimal state corresponding to the optimizer to obtain bit strings that provide approximations to the binary optimization problem.

Other aspects, such as implemented via a computer program product, can be directed towards facilitating solving a combinatorial optimization problem. The computer program product can comprise a computer readable storage medium having program instructions embodied therewith, the program instructions executable by a processor to cause the processor to map a cost function associated with the combinatorial optimization problem to an optimization problem over allowed quantum states, comprising constructing a quantum Hamiltonian for the cost function. The computer program product can generate a set of trial states by a physical time evolution of the quantum hardware interspersed with control pulses, measure a quantum cost function for the trial states, determine a trial state resulting in optimal values, and deform a Hamiltonian to find an optimal state and using the optimal state as a next starting state for a next optimization on a deformed Hamiltonian until an optimizer is determined with respect to a desired Hamiltonian.

The instructions to generate the set of trial states by the physical time evolution of quantum hardware interspersed with control pulses can comprise instructions to use the control pulses to generate entanglement. Constructing the quantum Hamiltonian for the cost function can comprise constructing a quantum Hamiltonian diagonal. Constructing the quantum Hamiltonian diagonal for the cost function can comprise expressing a quantum Hamiltonian as a linear combination of Pauli Z-terms.

The instructions to map the cost functions associated with the binary combinatorial optimization problem can comprise instructions to map the cost functions to a qubit representation on the approximate quantum computer. The instructions to measure the quantum cost functions for the trial states can comprise instructions to measure individual Pauli operators on the trial states. The instructions can comprise instructions to sample via the approximate quantum computer from the optimal state corresponding to the optimizer to obtain bit strings that provide approximations to the optimization problem.

Figure 14:
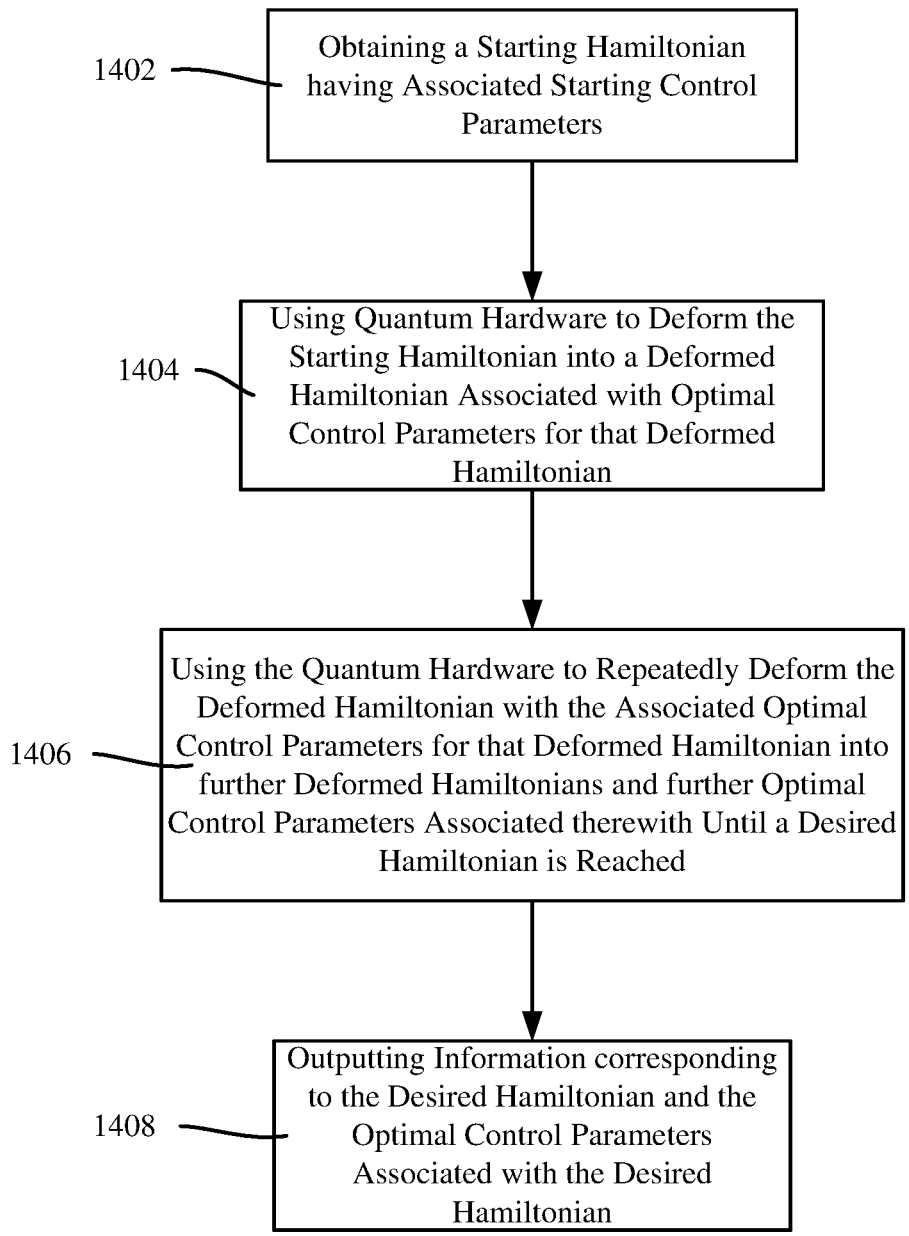
FIG. 14 illustrates a flow diagram of an example, non-limiting computer-implemented method facilitating optimization of an optimization problem via cost function deformation in accordance with one or more embodiments described herein.

Other aspects, exemplified as operations in FIG. 14, can comprise obtaining a starting Hamiltonian having associated starting control parameters (operation 1402) and using quantum hardware to deform the starting Hamiltonian into a deformed Hamiltonian associated with optimal control parameters for that deformed Hamiltonian (operation 1404). Aspects can comprise using the quantum hardware to repeatedly deform the deformed Hamiltonian with the associated optimal control parameters for that deformed Hamiltonian into further deformed Hamiltonians and further optimal control parameters associated therewith until a desired Hamiltonian is reached (operation 1406) and outputting information corresponding to the desired Hamiltonian and the optimal control parameters associated with the desired Hamiltonian (operation 1408).

Aspects can comprise sampling based on the information corresponding to the desired Hamiltonian and the optimal control parameters associated with the desired Hamiltonian to obtain data that provide approximations to a combinatorial optimization problem. Other aspects can comprise generating a set of trial states by a physical time evolution of the quantum hardware interspersed with control pulses that generate entanglement, measuring a quantum cost function for the trial states and determining a trial state resulting in optimal values.

A computer program product facilitating solving a binary combinatorial optimization problem can be provided, and the computer program product can comprise a computer readable storage medium having program instructions embodied therewith. The program instructions can be executable by a processor to cause the processor to obtain a starting Hamiltonian having associated starting control parameters, and use quantum hardware to deform the starting Hamiltonian into a deformed Hamiltonian associated with optimal control parameters for that deformed Hamiltonian. Other instructions can use the quantum hardware to repeatedly deform the deformed Hamiltonian with the associated optimal control parameters for that deformed Hamiltonian into further deformed Hamiltonians and further optimal control parameters associated therewith until a desired Hamiltonian is reached and output information corresponding to the desired Hamiltonian and the optimal control parameters associated with the desired Hamiltonian.

Other aspects can comprise instructions to sample based on the information corresponding to the desired Hamiltonian and the optimal control parameters associated with the desired Hamiltonian to obtain data that provide approximations to a combinatorial optimization problem. Still other aspects can comprise instructions to generate a set of trial states by a physical time evolution of the quantum hardware interspersed with control pulses that generate entanglement, measuring a quantum cost function for the trial states and determining a trial state resulting in optimal values.

Figure 15:
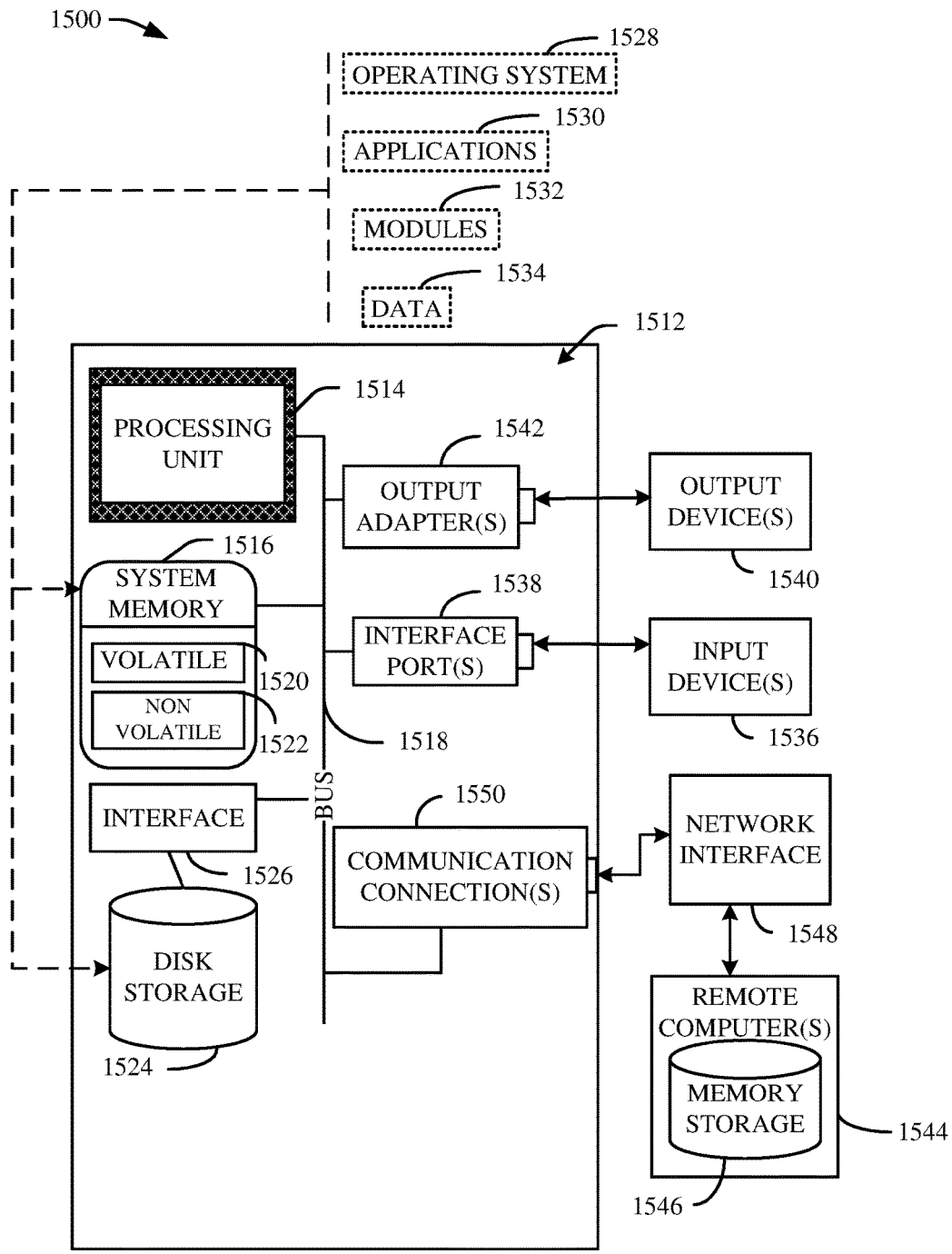
FIG. 15 illustrates a block diagram of an example, non-limiting operating environment in which one or more embodiments described herein can be facilitated.

In order to provide a context for the various aspects of the disclosed subject matter, FIG. 15 as well as the following discussion are intended to provide a general description of a suitable environment in which the various aspects of the disclosed subject matter can be implemented. FIG. 15 illustrates a block diagram of an example, non-limiting operating environment in which one or more embodiments described herein can be facilitated. Repetitive description of like elements employed in other embodiments described herein is omitted for sake of brevity.

With reference to FIG. 15, a suitable operating environment 1500 for implementing various aspects of this disclosure can also include a computer 1512. The computer 1512 can also include a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514. The system bus 1518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1516 can also include volatile memory 1520 and nonvolatile memory 1522. The basic input/output system (BIOS), containing the basic routines to transfer information between elements within the computer 1512, such as during start-up, is stored in nonvolatile memory 1522. Computer 1512 can also include removable/non-removable, volatile/non-volatile computer storage media. FIG. 15 illustrates, for example, a disk storage 1524. Disk storage 1524 can also include, but is not limited to, devices like a magnetic disk drive, floppy disk drive, tape drive, Jaz drive, Zip drive, LS-100 drive, flash memory card, or memory stick. The disk storage 1524 also can include storage media separately or in combination with other storage media. To facilitate connection of the disk storage 1524 to the system bus 1518, a removable or non-removable interface is typically used, such as interface 1526. FIG. 15 also depicts software that acts as an intermediary between users and the basic computer resources described in the suitable operating environment 1500. Such software can also include, for example, an operating system 1528. Operating system 1528, which can be stored on disk storage 1524, acts to control and allocate resources of the computer 1512.

System applications 1530 take advantage of the management of resources by operating system 1528 through program modules 1532 and program data 1534, e.g., stored either in system memory 1516 or on disk storage 1524. It is to be appreciated that this disclosure can be implemented with various operating systems or combinations of operating systems. A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port can be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a computer, a server, a router, a network PC, a workstation, a microprocessor based appliance, a peer device or other common network node and the like, and typically can also include many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the system bus 1518. While communication connection 1550 is shown for illustrative clarity inside computer 1512, it can also be external to computer 1512. The hardware/software for connection to the network interface 1548 can also include, for exemplary purposes only, internal and external technologies such as, modems including regular telephone grade modems, cable modems and DSL modems, ISDN adapters, and Ethernet cards.

The present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components;
    a processor that executes computer executable components stored in the memory, wherein the computer executable components comprise:
        a mapping component that maps a cost function to a Hamiltonian based on one or more constraints, wherein the Hamiltonian is associated with an optimization problem over allowed quantum states, and the Hamiltonian has a known answer at a time that the Hamiltonian is mapped;
        a trial state and measurement component that generates trial states corresponding to the Hamiltonian by physical time evolution of quantum hardware interspersed with control pulses to entangle qubits of the quantum hardware, and that measures a quantum cost function for the trial states to determine a trial state that results in optimal values; and
        a deformation component that deforms the Hamiltonian into a deformed Hamiltonian to find an optimal state, and uses the optimal state as a next starting state for a next optimization on the deformed Hamiltonian until an optimizer is determined with respect to a desired Hamiltonian.

2. The system of claim 1, further comprising a sampling component that samples from the optimal state corresponding to the optimizer to obtain one or more approximations to the optimization problem.

3. The system of claim 1, further comprising an interface that interacts with the mapping component and outputs the trial state that results in the optimal values.

4. The system of claim 1, wherein the trial state and measurement component measures individual Pauli operators on the trial states.

5. A computer-implemented method, comprising:
    facilitating, by a system operatively coupled to a processor, solving a combinatorial optimization problem using quantum hardware, the system comprising:
        mapping, by the system, a cost function associated with the combinatorial optimization problem to an optimization problem over allowed quantum states, comprising constructing a quantum Hamiltonian for the cost function, wherein the quantum Hamiltonian has a known answer at a time of the construction;
        generating, by the system, a set of trial states by a physical time evolution of the quantum hardware interspersed with control pulses;
        measuring, by the system, a quantum cost function for the trial states;
        determining, by the system, a trial state of the trial states resulting in optimal values; and
        deforming, by the system, a Hamiltonian to find an optimal state and using the optimal state as a next starting state for a next optimization on a deformed Hamiltonian until an optimizer is determined with respect to a desired Hamiltonian.

6. The computer-implemented method of claim 5, wherein the generating the set of trial states by the physical time evolution of quantum hardware interspersed with control pulses comprises using the physical time evolution to generate entanglement.

7. The computer-implemented method of claim 5, wherein the constructing the quantum Hamiltonian for the cost function comprises constructing a quantum Hamiltonian diagonal.

8. The computer-implemented method of claim 5, wherein the constructing the quantum Hamiltonian for the cost function comprises expressing a quantum Hamiltonian as a linear combination of Pauli Z-terms.

9. The computer-implemented method of claim 5, wherein the mapping the cost function associated with the combinatorial optimization problem comprises mapping the cost function to a qubit representation on the approximate quantum computer.

10. The computer-implemented method of claim 5, wherein the measuring the quantum cost function for the trial states comprises measuring individual Pauli operators on the trial states.

11. The computer-implemented method of claim 5, further comprising, sampling from the optimal state corresponding to the optimizer to obtain approximations to the combinatorial optimization problem.

12. The computer-implemented method of claim 5, wherein the combinatorial optimization problem comprises a binary combinatorial optimization problem, and further comprising sampling from the optimal state corresponding to the optimizer to obtain bit strings that provide approximations to the binary combinatorial optimization problem.

13. A computer program product facilitating solving a combinatorial optimization problem, the computer program product comprising a computer readable storage medium having program instructions embodied therewith, the program instructions executable by a processor to cause the processor to:
    map a cost function associated with the combinatorial optimization problem to an optimization problem over allowed quantum states, comprising constructing a quantum Hamiltonian for the cost function, wherein the quantum Hamiltonian has a known answer at a time of the construction;
    generate a set of trial states by a physical time evolution of the quantum hardware interspersed with control pulses;
    measure a quantum cost function for the trial states;
    determine a trial state resulting in optimal values; and
    deform a Hamiltonian to find an optimal state and using the optimal state as a next starting state for a next optimization on a deformed Hamiltonian until an optimizer is determined with respect to a desired Hamiltonian.

14. The computer program product of claim 13, wherein the program instructions are further executable by the processor to cause the processor to generate the set of trial states by the physical time evolution of quantum hardware interspersed with control pulses comprises instructions to use the control pulses to generate entanglement.

15. The computer program product of claim 13, wherein the constructing the quantum Hamiltonian for the cost function comprises constructing a quantum Hamiltonian diagonal.

16. The computer program product of claim 13, wherein the constructing the quantum Hamiltonian diagonal for the cost function comprises expressing a quantum Hamiltonian as a linear combination of Pauli Z-terms.

17. The computer program product of claim 13, wherein the instructions to map the cost functions associated with the combinatorial optimization problem comprises instructions to map the cost functions to a qubit representation on the approximate quantum computer.

18. The computer program product of claim 13, wherein the instructions to measure the quantum cost functions for the trial states comprises instructions to measure individual Pauli operators on the trial states.

19. The computer program product of claim 13, wherein the program instructions are further executable by the processor to cause the processor to sample via the approximate quantum computer from the optimal state corresponding to the optimizer to obtain bit strings that provide approximations to the optimization problem.

20. A computer-implemented method, comprising:
    obtaining, by a system operatively coupled to a processor, a starting Hamiltonian having associated starting control parameters, wherein the starting Hamiltonian has a known answer at a time of the obtaining;
    using, by the system, quantum hardware to deform the starting Hamiltonian into a deformed Hamiltonian associated with optimal control parameters for that deformed Hamiltonian;
    using, by the system, the quantum hardware to repeatedly deform the deformed Hamiltonian with the associated optimal control parameters for that deformed Hamiltonian into further deformed Hamiltonians and further optimal control parameters associated therewith until a desired Hamiltonian is reached; and
    outputting, by the system, information corresponding to the desired Hamiltonian and the optimal control parameters associated with the desired Hamiltonian.

21. The computer-implemented method of claim 20, further comprising sampling, by the system, based on the information corresponding to the desired Hamiltonian and the optimal control parameters associated with the desired Hamiltonian to obtain data that provide approximations to a combinatorial optimization problem.

22. The computer-implemented method of claim 20, further comprising generating, by the system, a set of trial states by a physical time evolution of the quantum hardware interspersed with control pulses that generate entanglement, measuring a quantum cost function for the trial states and determining a trial state resulting in optimal values.

23. A computer program product facilitating solving a binary combinatorial optimization problem, the computer program product comprising a computer readable storage medium having program instructions embodied therewith, the program instructions executable by a processor to cause the processor to:
    obtain a starting Hamiltonian having associated starting control parameters, wherein the starting Hamiltonian has a known answer at a time the starting Hamiltonian is obtained;
    use quantum hardware to deform the starting Hamiltonian into a deformed Hamiltonian associated with optimal control parameters for that deformed Hamiltonian;
    use the quantum hardware to repeatedly deform the deformed Hamiltonian with the associated optimal control parameters for the deformed Hamiltonian into further deformed Hamiltonians and further optimal control parameters associated therewith until a desired Hamiltonian is reached; and
    output information corresponding to the desired Hamiltonian and the optimal control parameters associated with the desired Hamiltonian.

24. The computer program product of claim 23, wherein the program instructions are further executable by the processor to cause the processor to sample based on the information corresponding to the desired Hamiltonian and the optimal control parameters associated with the desired Hamiltonian to obtain data that provide approximations to a combinatorial optimization problem.

25. The computer program product of claim 23, wherein the program instructions are further executable by the processor to cause the processor to generate a set of trial states by a physical time evolution of the quantum hardware interspersed with control pulses that generate entanglement, measuring a quantum cost function for the trial states and determining a trial state resulting in optimal values.

* * * * *